United States Patent
Chatterjee et al.

(10) Patent No.: US 10,693,367 B1
(45) Date of Patent: Jun. 23, 2020

(54) PRE-CHARGING CIRCUIT FOR POWER CONVERTERS

(71) Applicants: Rolls-Royce North American Technologies, Inc., Indianapolis, IN (US); Rolls-Royce Singapore Pte. Ltd., Singapore (SG)

(72) Inventors: Pradip Chatterjee, Soest (DE); Chandana Jayampathi Gajanayake, Singapore (SG); Eric D. Schneider, Carmel, IN (US); Devinda A. Molligoda, Singapore (SG); Amit Kumar Gupta, Singapore (SG)

(73) Assignees: Rolls-Royce North American Technologies, Inc., Indianapolis, IN (US); Rolls-Royce Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/279,436

(22) Filed: Feb. 19, 2019

(51) Int. Cl.
*H02M 3/07* (2006.01)
*H02M 1/32* (2007.01)
*H02P 27/06* (2006.01)

(52) U.S. Cl.
CPC ............ *H02M 3/07* (2013.01); *H02M 1/32* (2013.01); *H02P 27/06* (2013.01)

(58) Field of Classification Search
CPC .......... H02M 3/07; H02M 3/073; H02M 1/32
See application file for complete search history.

(56) References Cited

U.S. PATENT DOCUMENTS

| 5,132,895 | A  | * | 7/1992  | Kase ..................... H02M 3/07 363/60 |
| 5,729,163 | A  | * | 3/1998  | McCleary ............. H02M 3/07 307/110 |
| 6,429,632 | B1 | * | 8/2002  | Forbes .................. H02M 3/07 323/282 |
| 6,559,689 | B1 | * | 5/2003  | Clark ................... H03K 17/063 327/337 |
| 8,519,686 | B2 |   | 8/2013  | Rozman et al. |
| 8,598,854 | B2 | * | 12/2013 | Soenen .................. G05F 1/575 323/269 |
| 8,716,997 | B2 |   | 5/2014  | Rao et al. |
| 8,817,501 | B1 | * | 8/2014  | Low ...................... H02M 3/073 363/60 |
| 9,197,056 | B2 |   | 11/2015 | Liu et al. |
| 9,931,947 | B2 | * | 4/2018  | Roessler ............... B60L 50/51 |
| 10,027,223 | B1 |  | 7/2018  | Zhang et al. |

(Continued)

FOREIGN PATENT DOCUMENTS

CN            1479427 A        3/2004

*Primary Examiner* — Daniel Kessie
*Assistant Examiner* — Sisay G Tiku
(74) *Attorney, Agent, or Firm* — Shumaker & Sieffert, P.A.

(57) ABSTRACT

In some examples, an electrical power system includes a differential bus including a high-side rail and a low-side rail, a power source configured to generate power, and a bulk capacitor coupled between the high-side rail and the low-side rail, the bulk capacitor configured to filter the power generated by the power source. The electrical power system also includes a converter configured to convert the power filtered by the bulk capacitor and a pre-charging circuit comprising one or more switches and a middle capacitor, the pre-charging circuit configured to pre-charge the bulk capacitor.

20 Claims, 12 Drawing Sheets

(56) References Cited

U.S. PATENT DOCUMENTS

| | | | |
|---|---|---|---|
| 2007/0183174 A1* | 8/2007 | Lee | H02M 1/08 |
| | | | 363/111 |
| 2007/0216425 A1* | 9/2007 | Okamura | H01G 9/14 |
| | | | 324/678 |
| 2009/0121781 A1* | 5/2009 | Oyama | H02M 3/07 |
| | | | 327/536 |
| 2011/0241766 A1* | 10/2011 | Zhang | H02M 3/07 |
| | | | 327/536 |
| 2012/0001683 A1* | 1/2012 | Wang | H02M 3/07 |
| | | | 327/536 |
| 2015/0207401 A1 | 7/2015 | Zhang et al. | |
| 2015/0288278 A1* | 10/2015 | Shao | G11C 16/14 |
| | | | 327/536 |
| 2017/0126120 A1 | 5/2017 | Chakraborty et al. | |
| 2017/0353105 A1 | 12/2017 | Solie et al. | |
| 2019/0312514 A1* | 10/2019 | Hukel | H02M 3/1582 |

* cited by examiner

_US 10,693,367 B1_

PRE-CHARGING CIRCUIT FOR POWER CONVERTERS

TECHNICAL FIELD

This disclosure relates to electrical power systems.

BACKGROUND

An electrical power system may include a power source and a load separated by a set of switches. The set of switches may allow power to flow in either direction between the power source and the load. During a startup mode, the voltage level across the power source may be much higher than the voltage level at the load. When the set of switches allows power to flow between the power source and the load, a high inrush current may flow from the power source to the load. This high inrush current can damage the components of the electrical power system, including the switches and capacitors.

SUMMARY

This disclosure describes methods, systems, and techniques for pre-charging a bulk capacitor that is coupled between the rails of a differential bus. A pre-charging circuit can control the inrush current from a power source to the bulk capacitor using one or more switches and a middle capacitor. The circuit can be connected between a power source and a differential bus. A bulk capacitor may be configured to filter the power generated by the power source. In addition, the differential bus may be coupled to a converter that can receive the power filtered by the bulk capacitor.

Although the pre-charging functionality of the pre-charging circuit is described herein, the circuit may include other functional aspects such as for detecting short circuits, detecting reverse polarity, prevent reverse power flow, and/or monitoring the condition of components of the electrical power system. The description of the pre-charging functionality is not intended to limit the other potential functional aspects of the circuit. Moreover, in some examples, the circuit can be used for one or more of the other functions without being used for pre-charging.

The details of one or more examples are set forth in the accompanying drawings and the description below. Other features, objects, and advantages will be apparent from the description and drawings, and from the claims.

DETAILED DESCRIPTION

This disclosure describes devices, methods, and techniques for using an isolation circuit connecting and disconnecting a power source and a load using a pre-charging circuit. The isolation circuit, which may also be referred to as a pre-charging circuit, can also be used for pre-charging a bulk capacitor coupled between the high-side rail and the low-side rail of a differential bus of an electrical power system. The pre-charging techniques may maintain the inrush current to the bulk capacitor within an acceptable range, which may prevent or reduce damage to the components of the electrical power system. The electrical power system may include a pre-charging circuit having one or more switches and a middle capacitor. A controller can control the switches of the pre-charging circuit to deliver electrical power to the bulk capacitor during a startup mode of the electrical power system.

In general, this disclosure describes techniques for transferring energy from a power source to a differential bus by storing smaller amounts of energy on a middle capacitor coupled between the power source and the differential bus. The techniques can result in a smaller inrush current that flows to a bulk capacitor coupled between the rails of a differential bus. A controller may transfer energy from a power source to a middle capacitor and concurrently isolate the middle capacitor from the bulk capacitor. The controller may then transfer energy from the middle capacitor to the bulk capacitor and concurrently isolate the middle capacitor from the power source.

Although this disclosure describes the use of a circuit for pre-charging, the circuit topology can be used for other purposes and does not have to be used for pre-charging an electrical power system. For example, the pre-charging circuit can connect and disconnect a power source and a load or converter. A controller can also use the pre-charging circuit topology for detecting issues in a bulk capacitor, for detecting reverse polarity issues, and for controlling systems with multiple power sources.

Figure 1:
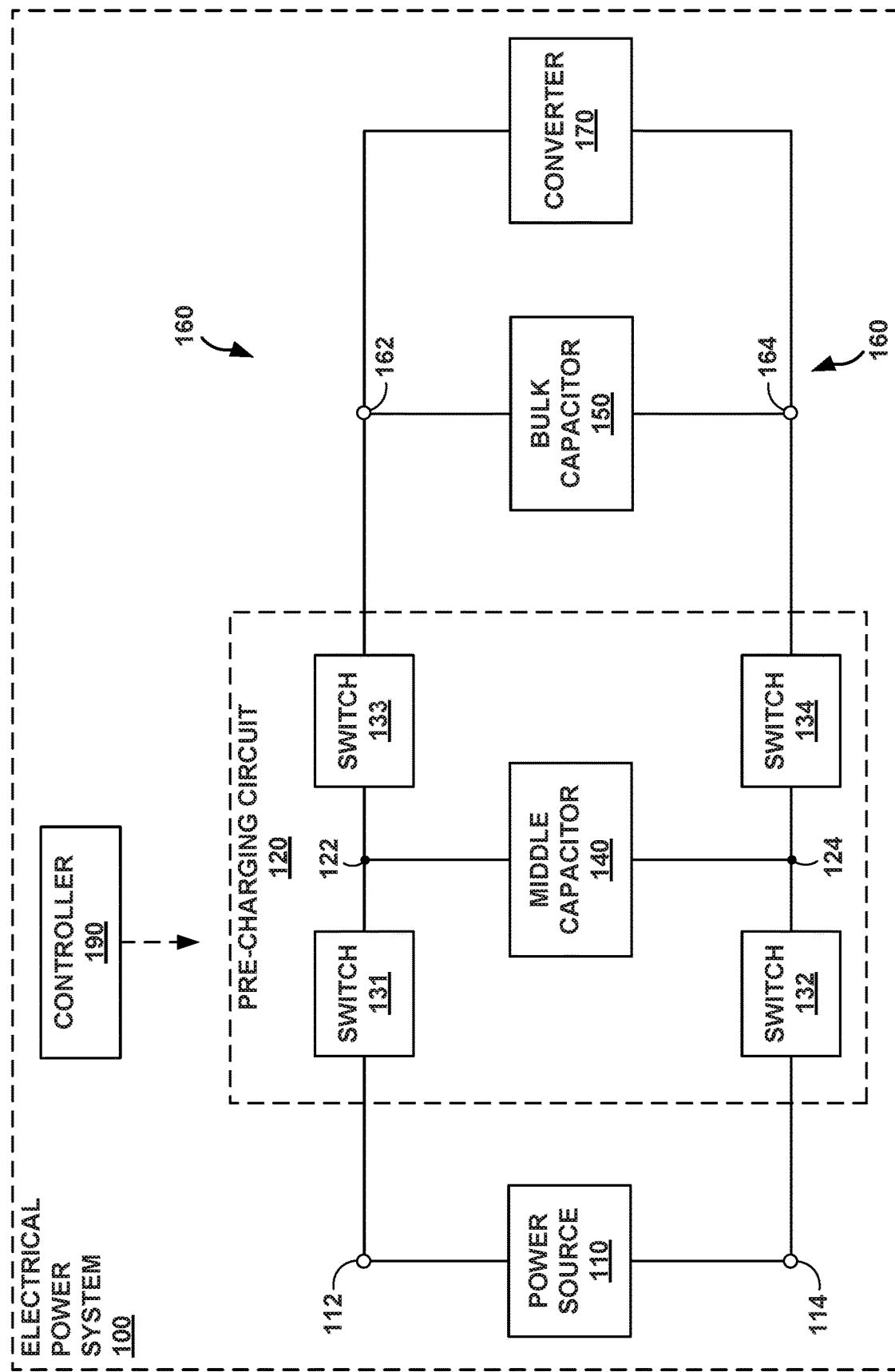
FIG. 1 is a conceptual block diagram illustrating a pre-charging circuit coupled between a power source and a differential bus, in accordance with one or more techniques of this disclosure.

FIG. 1 is a conceptual block diagram illustrating a pre-charging circuit 120 coupled between a power source 110 and a differential bus 160, in accordance with one or more techniques of this disclosure. Electrical power system 100 is configured to deliver electrical power generated by power source 110 to converter 170 via pre-charging circuit 120 and differential bus 160. In the example of FIG. 1, electrical power system 100 includes power source 110, pre-charging circuit 120, bulk capacitor 150, differential bus 160, converter 170, and controller 190.

However, FIG. 1 shows just one example of electrical power system 100, and many other examples of electrical power system 100 may exist. For instance, in some examples, electrical power system 100 may be configured to operate in a reverse direction, where electrical power system 100 includes a power source coupled to differential bus 160 and a converter coupled to switches 131 and 132. In other examples, electrical power system 100 is a bi-directional system where both power source 110 and converter 170 can operate as a power source and/or an electrical load.

Electrical power system 100 may include a micro-grid, a mixed alternating-current/direct-current (AC/DC) system, an AC/AC system, a DC/DC system, an AC bus, a DC bus, and/or any other type of electrical system. Electrical power system 100 may also be part of a power generation system such as a power plant, a power distribution system, and/or a residential or commercial power system, which may include energy storage and electrical loads. Electrical power system 100 may be a part of an aerospace, marine, or automotive system. The techniques of this disclosure may be especially useful in electrical vehicles, such as for the battery disconnect systems in electrical vehicles. Electrical power system 100 may be part of a vehicle such as any manned or unmanned: air vehicle, land vehicle, marine vehicle, space vehicle, and the like, which may include an engine, a generator, an alternator, and/or a power distribution system.

Power source 110 may be configured to generate electrical power. Power source 110 can include an electric generator that converts mechanical power derived from a shaft, rotor, and/or other mechanical component to electrical power for use by other components or circuits of electrical power system 100. In some examples, the electric generator may also be mounted to a mechanical distribution system and/or a mechanical transmission system (for clarity in the drawings, neither of which is shown). In some examples, electrical power system 100 may include one or more additional power sources, also not shown in FIG. 1. Power source 110 can include an AC generator such as an induction generator or a DC generator that produces DC electricity. Power source 110 may include a wound field machine, a Halbach array generator with permanent magnets on a rotor that is driven by an engine shaft or a propulsor shaft, or any other type of generator.

Power source 110 may, in some examples, generate AC electricity (e.g., multi-phase AC electricity), and electrical power system 100 includes a power converter to generate DC electricity based on the power generated by power source 110. The power converter may be a rectifier circuit that converts AC electricity to DC electricity.

Converter 170 may represent one example of the power converter discussed above. That is, converter 170 may be configured to convert the power received from power source 110 to another form of electricity for an electrical load (not shown in FIG. 1). Converter 170 may produce electrical power in a form that is usable by an electrical load. For example, converter 170 may include an inverter configured to convert DC electricity received by converter 170 to AC electricity for an electric motor. In some examples, electrical power system 100 can include a load that takes electricity directly from differential bus 160 without a converter.

Controller 190 may be configured to control the operation of power source 110, pre-charging circuit 120, and/or converter 170. For example, controller 190 can control the operation of converter 170 by delivering control signals to the switches of converter 170. Controller 190 may be configured to control a mode of operation of converter 170 to deliver power to differential bus 160 and/or to an electrical load. Controller 190 may also be able to activate or deactivate power source 110 or otherwise control a mode of operation of power source 110 to deliver different levels and/or types of power.

Controller 190 may include any suitable arrangement of hardware, software, firmware, or any combination thereof, to perform the techniques attributed to controller 190 herein. Examples of controller 190 include any one or more microprocessors, digital signal processors (DSPs), application specific integrated circuits (ASICs), full authority digital engine control (FADEC) units, engine control units (ECUs), field programmable gate arrays (FPGAs), or any other equivalent integrated or discrete logic circuitry, as well as any combinations of such components. When controller 190 includes software or firmware, controller 190 further includes any hardware for storing and executing the software or firmware, such as one or more processors or processing units. In examples in which electrical power system 100 is mounted on a vehicle, controller 190 may be implemented by a FADEC unit.

In general, a processing unit may include one or more microprocessors, DSPs, ASICs, FPGAs, or any other equivalent integrated or discrete logic circuitry, as well as any combinations of such components. Although not shown in FIG. 1, controller 190 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 190 (e.g., may be external to a package in which controller 190 is housed).

Differential bus 160 includes high-side rail 162 and low-side rail 164. Differential bus 160 may operate as a DC bus, where the voltage levels on each of rails 162 and 164 are DC values during normal operation. Although FIG. 1 depicts differential bus 160 as a two-level bus, differential bus 160 may also be a three-level bus with a third rail connected to a reference voltage (e.g., a middle rail connected to reference ground). During a startup mode of electrical power system 100, the voltage level across differential bus 160 may be much lower than the target voltage level. The target voltage level may be tens or hundreds of volts, such as 28 volts, 270 volts, 540 volts, or 750 volts in some examples. The voltage level across differential bus 160 may also be much lower than the voltage generated by power source 110. To increase the voltage level across differential bus 160, controller 190 can control pre-charging circuit 120 to deliver transfer energy from power source 110 to differential bus 160.

Bulk capacitor 150 may be coupled between high-side rail 162 and low-side rail 164. A first node of bulk capacitor 150 may be coupled to switch 133, and a second node of bulk capacitor 150 may be coupled to switch 134. The power generated by power source 110 that differential bus 160 receives from pre-charging circuit 120 can be filtered by bulk capacitor 150. Bulk capacitor 150 can act as a low-pass filter for the energy transferred from power source 110 to differential bus 160. Bulk capacitor 150 can filter the ripple generated by power source 110 or by converter 170 by preventing ripple currents from reaching back to power source 110 and smoothing out variations in the voltage across differential bus 160. The capacitance of bulk capacitor 150 may be in a range between two hundred microfarads and five millifarads or in a range between one hundred microfarads and ten millifarads. In some examples, the capacitance of bulk capacitor 150 may be as high as one hundred millifarads.

During a startup mode of electrical power system 100, the voltage across power source 110 may be much larger than the voltage across rails 162 and 164. In the startup mode, bulk capacitor 150 may have an uncharged state, which can result in a high inrush current flowing from node 112 to high-side rail 162, through bulk capacitor 150, and back through low-side rail 164 to node 114. In examples in which bulk capacitor 150 is uncharged and directly exposed to power source 110, the inrush current can be much larger than the nominal current rating of switches 131-134 and/or bulk capacitor 150. When in an uncharged state, bulk capacitor 150 can draw power from power source 110 at a high rate, which creates a large inrush current. For example, the inrush current can be one hundred times larger than the current rating of a component of electrical power system 100. A large inrush current may cause damage to bulk capacitor 150 and the other components of electrical power system 100.

In accordance with various aspects of the techniques of this disclosure, controller 190 may be configured to control switches 131-134 of pre-charging circuit 120 to pre-charge bulk capacitor 150. In some examples, controller 190 is configured to activate and deactivate switches 131-134 to transfer energy from power source 110 to middle capacitor 140. Controller 190 may then activate and deactivate switches 131-134 to transfer energy from middle capacitor 140 to bulk capacitor 150. By transferring energy to middle capacitor 140, controller 190 can maintain the inrush current experienced by bulk capacitor 150 within an acceptable range.

The pre-charging techniques described herein allow for pre-charging bulk capacitor 150 to a target voltage level while preventing the damage to the components of electrical power system 100 that can occur due to high inrush currents resulting from bulk capacitor 150 drawing large amounts of power from power source 110. Pre-charging circuit 120 can maintain the inrush current within an acceptable range without the additional cost, size, and weight of a separate or external pre-charging circuit.

Another option for maintaining an inrush current within an acceptable range is to connect an external pre-charging circuit to the bulk capacitor. An external pre-charging circuit may be separate from the solid-state power converter (SSPC) that is coupled between a power source and the bulk capacitor. The external pre-charging circuit adds size, weight, and cost to an electrical power system. In contrast, pre-charging circuit 120 may be integrated into a SSPC that is coupled between power source 110 and differential bus 160, which may have a smaller impact on the size and weight of electrical power system 100.

An additional option for mitigating the effects of a harmful inrush current is to use more robust components to withstand the increased electrical and thermal stress caused by the inrush current. More robust components, however, can add weight and cost to the electrical power system. In contrast, pre-charging circuit 120 can maintain the inrush current within an acceptable range, without requiring more robust components and without increasing the weight of electrical power system 100.

As shown in the example of FIG. 1, pre-charging circuit 120 includes one or more switches 131-134 and middle capacitor 140. In some examples, pre-charging circuit 120 includes an SSPC. Pre-charging circuit 120 may also be referred to as an isolation circuit because pre-charging circuit 120 does not necessarily have to be used to pre-charge bulk capacitor 150 in all examples. Controller 190 can also use pre-charging circuit 120 for monitoring the performance and conditions of the components of electrical power system 100, as described herein.

Pre-charging circuit 120 may be coupled between power source 110 and differential bus 160. Pre-charging circuit 120 can pre-charge bulk capacitor 150 based on the power generated by power source 110. Pre-charging circuit 120 may be configured to operate as a bi-directional pre-charging circuit, such that pre-charging circuit 120 can perform pre-charging in two directions. In a first direction, pre-charging circuit 120 can pre-charge bulk capacitor 150 based on power generated by power source 110. In a second direction, pre-charging circuit 120 can pre-charge a bulk capacitor connected in parallel with power source 110 based on power received from converter 170.

Switches 131-134 of pre-charging circuit 120 are coupled between nodes 112 and 114 of power source 110 and rails 162 and 164 of differential bus 160. In the example of FIG. 1, switch 131 is coupled to node 112 of power source 110, switch 132 is coupled to node 114 of power source 110, switch 133 is coupled to high-side rail 162, and switch 134 is coupled to low-side rail 164. In some examples, pre-charging circuit 120 can include an arrangement of switches 131-134 that is different than the arrangement shown in FIG. 1. For example, pre-charging circuit 120 can include more or fewer than four switches.

Middle capacitor 140 may be coupled between switches 131 and 133 on one end and switches 132 and 134 on another end. A first node of middle capacitor may be coupled to node 122 between switches 131 and 133, and a second node of middle capacitor 140 may be coupled to node 124 between switches 132 and 134. Middle capacitor 140 can include a metallized film capacitor. In some examples, middle capacitor 140 may have self-healing properties such that middle capacitor 140 can sustain a breakthrough current (e.g., a short circuit) without a permanent decrease in capacitance. Thus, middle capacitor 140 may support fail-safe operation. A common reason for a breakthrough current is a high-voltage transient. The transient can cause a breakdown and damage to other components of electrical power system 100, and this damage can be permanent. If the high-voltage transient caused a failure, such as a line-to-line short or line-to-ground short, at converter 170 or bulk capacitor 150 that can be diagnosed by controller 190, then controller 190 can isolate the fault. Due to its fail-safe nature, middle capacitance 140 may sustain normal operation, so controller 190 does not have to isolate middle capacitor 140. "Fail-safe" means that a damaged device can be isolated from the rest of electrical power system 100.

Middle capacitor 140 can have a capacitance that is in a range between one nanofarad and ten microfarads or in a range between ten nanofarads and one microfarad. The inrush current from middle capacitor 140 to bulk capacitor 150 may be based on the capacitance of middle capacitor 140. A lower capacitance for middle capacitor 140 may result in a lower inrush current from middle capacitor 140 to bulk capacitor 150. The capacitance of middle capacitor 140 can be selected based on the ratio of capacitances of capacitors 140 and 150. The voltage change for bulk capacitor 150 during each charging cycle may be based on the ratio of capacitances of capacitors 140 and 150.

In operation, controller 190 can control the operation of pre-charging circuit 120 by controlling the operation of switches 131-134. Controller 190 can deliver control signals to a control terminal of each of switches 131-134 to activate or deactivate each of switches 131-134. In some examples, controller 190 is configured to control the operation of power source 110 and/or converter 170. By controlling switches 131-134, controller 190 may be able to control the pre-charging of bulk capacitor 150 and differential bus 160.

For example, by controlling switches 131-134, controller 190 may connect power source 110 and middle capacitor 140 to charge middle capacitor 140. Controller 190 can deactivate switches 133 and 134 and thereby charge middle capacitor 140 while concurrently isolating middle capacitor 140 from bulk capacitor 150. Controller 190 may also control switches to connect middle capacitor 140 and differential bus 160 to move charge from middle capacitor 140 to bulk capacitor 150. Controller 190 can deactivate switches 131 and 132 and thereby move charge from middle capacitor 140 to bulk capacitor 150.

To activate one of switches 131-134, controller 190 can deliver an enabling control signal to the control terminal of the respective switch. Responsive to receiving the enabling control signal, the respective switch may close and allow current to flow across the switch (e.g., between the load terminals of the switch). The enabling control signal, along with a voltage difference across the respective switch, may cause or facilitate the flow of electricity across the respective switch. To deactivate one of switches 131-134, controller 190 can deliver a disabling control signal to the control terminal of the respective switch. Responsive to receiving the disabling control signal, the respective switch may open and prevent current from flowing across the switch.

Controller 190 can repeat the charging process until the voltage level across bulk capacitor 150 is greater than a threshold voltage level. Thus, in the pre-charging process, controller 190 may charge middle capacitor 140, move the charge from middle capacitor 140 to bulk capacitor 150, and then charge middle capacitor 140 again. The iterations of the pre-charging cycle can continue until controller 190 determines that the voltage level across bulk capacitor 150 is greater than a threshold voltage level. By transferring a relatively small amount of energy from power source 110 to bulk capacitor 150 during each pre-charging cycle, controller 190 can limit the inrush current, especially in the event of a short circuit in electrical power system 100. Controller 190 may be configured to monitor the voltages at capacitors 140 and 150 to control the pre-charging sequence.

Controller 190 may receive a signal from differential bus 160 that indicates the voltage difference between rails 162 and 164. Controller 190 can determine whether the signal is less than a first threshold level and, responsive to determining that the signal is less than the first threshold level, pre-charge bulk capacitor 150. After beginning the pre-charging process, controller 190 can determine whether the signal is less than a second threshold level and continue pre-charging bulk capacitor 150 in response to determining that the signal is less than the second threshold level. Responsive to determining that the signal is greater than the second threshold level, controller 190 can stop pre-charging bulk capacitor 150. The first threshold level and the second threshold level may be the same or different, depending on the specific application.

Controller 190 may be configured to pre-charge bulk capacitor 150 during a startup mode of electrical power system 100. Controller may pre-charge bulk capacitor 150 prior to enabling the operation of converter 170. Converter 170 may begin converting the power filtered by bulk capacitor 150 after the voltage across bulk capacitor 150 reaches a threshold level. Controller 190 may enable the operation of converter 170 in response to determining that the voltage across bulk capacitor 150 is greater than the threshold level.

In this way, controller 190 may perform various aspects of the pre-charging techniques to potentially avoid high inrush currents that may otherwise harm electrical power system 100. Pre-charging circuit 120 may weigh less and be smaller than another pre-charging circuit that is external to electrical power system 100. Using a design to control the amplitude of inrush currents can allow the use of smaller and less expensive switches 131-134, as compared to another system that experiences higher inrush currents. Each of switches 131-134 may have a lower safe operating area and a longer transition time from linear mode to switch mode, as compared to the switches in another system that experiences higher inrush currents. Weight and size may be an especially important consideration for electrical power systems in vehicles such as aircraft, marine vehicles, and automobiles.

Figure 2:
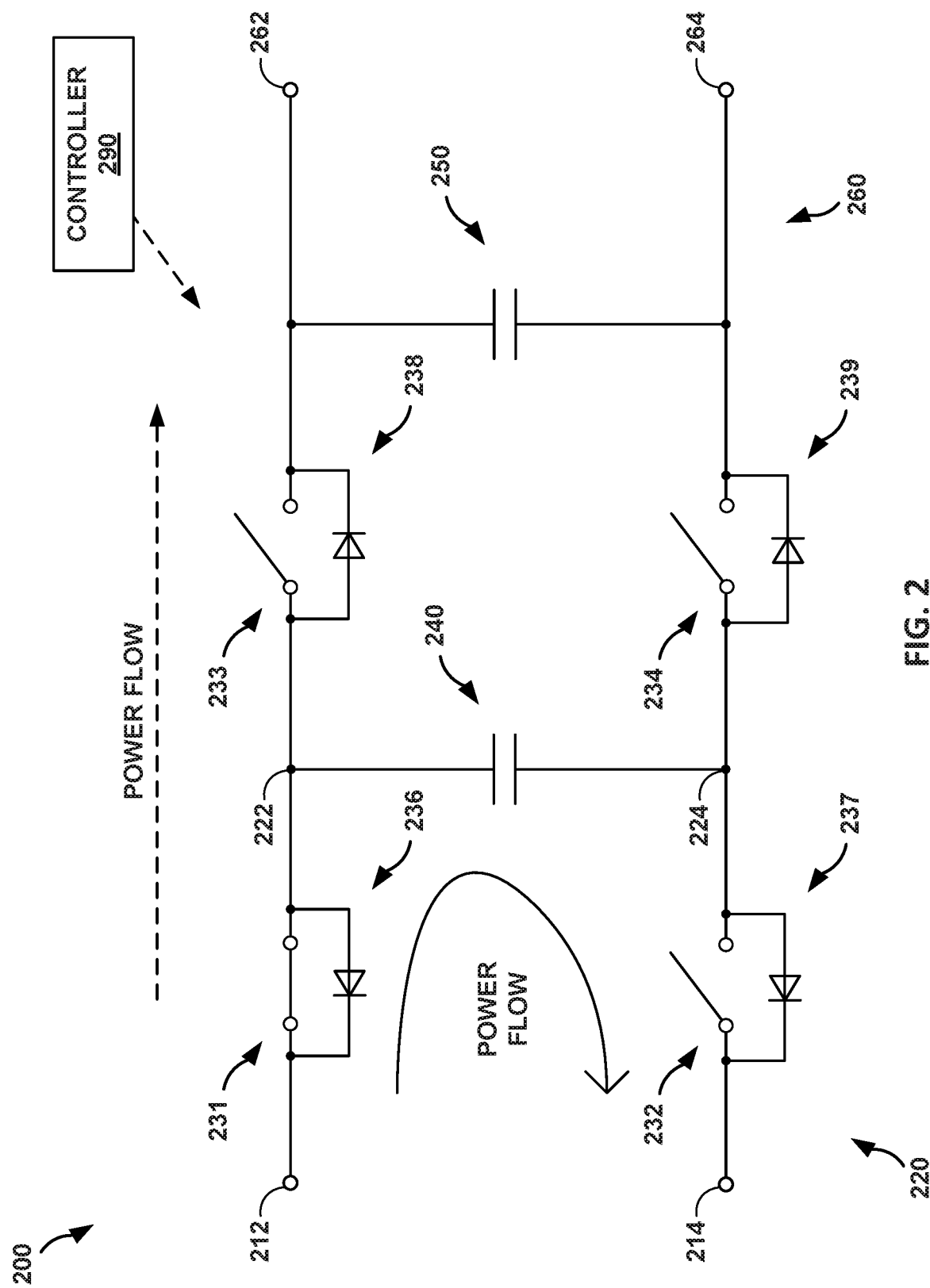
FIGS. 2 and 3 are schematic diagrams showing a forward charging mode, in accordance with one or more techniques of this disclosure.
Figure 3:
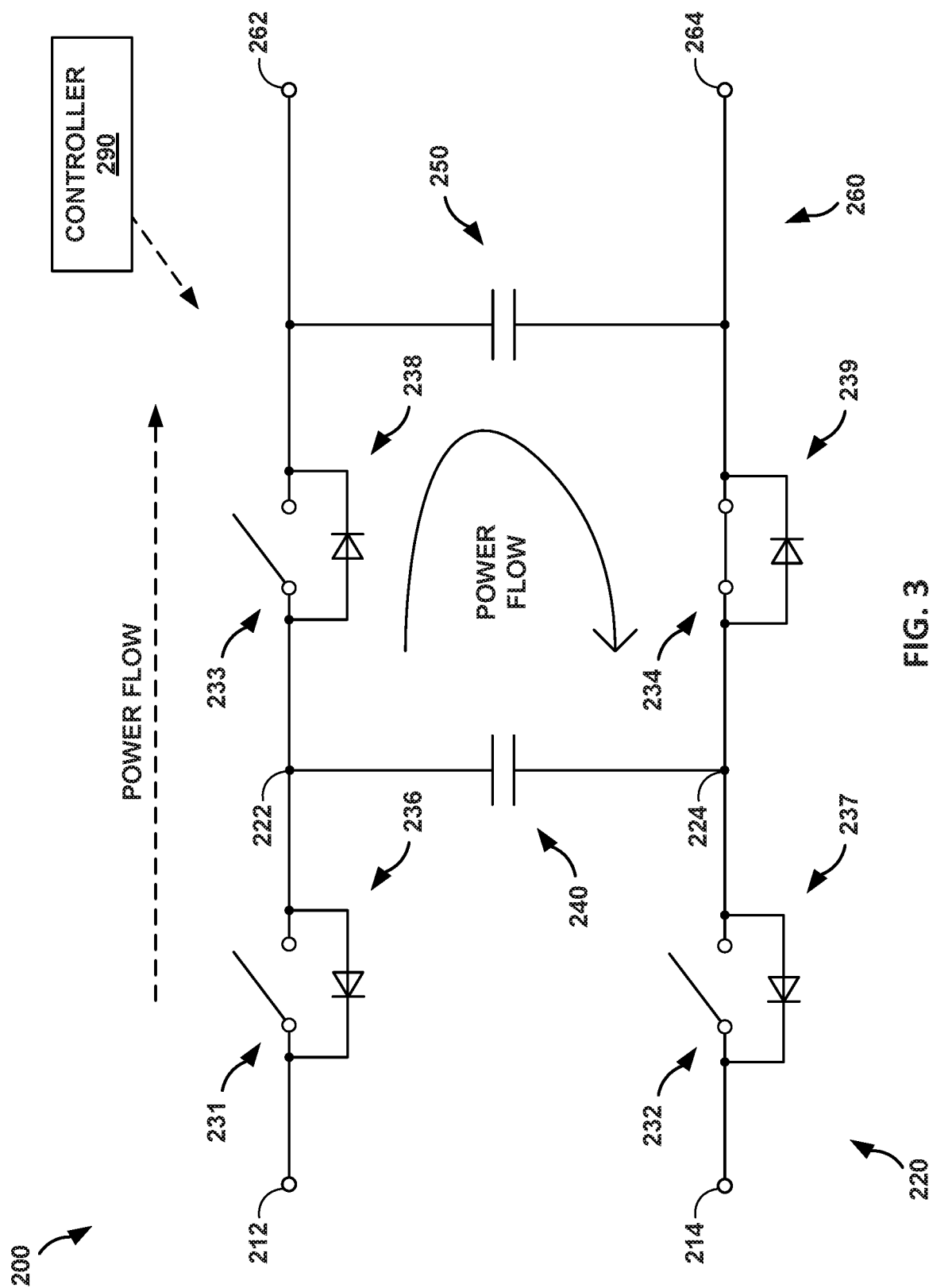

FIGS. 2 and 3 are schematic diagrams showing a forward charging mode, in accordance with one or more techniques of this disclosure. As shown in the example of FIGS. 2 and 3, electrical power system 200 includes pre-charging circuit 220, bulk capacitor 250, differential bus 260, and controller 290. Pre-charging circuit 220 is coupled between nodes 212 and 214 on a first side and rails 262 and 264 on a second side. Nodes 212 and 214 may be coupled to a power source, a converter, and/or an electrical load.

Each of switches 231-234 is connected in parallel with a respective one of diodes 236-239. Diodes 236 and 237 may allow power to flow from middle capacitor 240 to nodes 212 and 214. Diodes 238 and 239 may allow power to flow from middle capacitor 240 to rails 262 and 264. With respect to the description of electrical power systems 200 and 400 shown in FIGS. 2-5, the flow of power refers to the flow of positive carriers. However, in some instances, diodes 236-239 can be arranged to allow the flow of negative carriers from middle capacitor 240 to nodes 212 and 214 or from middle capacitor 240 to rails 262 and 264.

In operation, controller 290 may be configured to transfer energy from nodes 212 and 214 to middle capacitor 240 and concurrently isolate middle capacitor 240 from differential bus 260. As shown in the example of FIG. 2, controller 290 can transfer energy from nodes 212 and 214 to middle capacitor 240 by activating switch 231 so that power flows from node 212 through node 222 and activated switch 231 to middle capacitor 240. On a return path, the power may also flow back to node 214 through node 224 and diode 237, even though switch 232 is deactivated in the example of FIG. 2. In some examples, controller 290 activates switch 232 when power flows through diode 237 to reduce the power dissipation in electrical power system 200 because switch 232 has a smaller voltage drop than diode 237. Controller 290 can isolate middle capacitor 240 from differential bus 260 by deactivating switches 233 and 234. The charge Q and energy U stored in middle capacitor 240 are functions of the voltage V generated by the power source and the capacitance C of middle capacitor 240, as shown in Equation (1).

$$U_{mid} = \tfrac{1}{2} CV^2 \quad (1)$$

$$Q_{mid} = V_{source} \times C_{mid} \quad (2)$$

Controller 290 may be configured to transfer energy from middle capacitor 240 to bulk capacitor 250 and concurrently isolate middle capacitor 240 from nodes 212 and 214. As shown in the example of FIG. 3, controller 290 can transfer energy from middle capacitor 240 to bulk capacitor 250 by activating switch 234. For example, controller 290 can activate on switch 234 so that power flows from middle capacitor 240 through node 222 and diode 238 to bulk capacitor 250. In some examples, controller 290 activates switch 233 when power flows through diode 238 to reduce the power dissipation in electrical power system 200. On a return path, the power may also flow back to middle capacitor 240 through activated switch 234 and node 224.

Controller 290 can isolate middle capacitor 240 from nodes 212 and 214 by deactivating switches 231 and/or 232.

Controller 290 can control switches 231-234 to store a small amount of energy at middle capacitor 240 during each charging cycle. During the charging of middle capacitor 240, controller 290 isolates bulk capacitor 250 and differential bus 260 from middle capacitor 240. During the second half of each charging cycle, controller 290 isolates the power source from middle capacitor 240. Controller 290 then feeds the energy stored at middle capacitor 240 to bulk capacitor 250, which limits the pulsed energy that is discharged to bulk capacitor 250, differential bus 260, and any downstream converters and/or electrical loads. In examples in which a downstream component has a short circuit, the pre-charging process reduces the risk of damage to the components of electrical power system 200. Controller 290 continues the pre-charging process until bulk capacitor 250 reaches a sufficient voltage level.

Controller 290 can pre-charge bulk capacitor 250 while maintaining the inrush current from middle capacitor 240 to bulk capacitor 250 within an acceptable range. Controller 290 can limit the inrush current to bulk capacitor 250 by not allowing power flow from nodes 212 and 214 to bulk capacitor 250. In examples in which middle capacitor 240 is isolated from nodes 212 and 214, the inrush current is based on the energy stored by middle capacitor 240. Middle capacitor 240 may be configured to store a relatively small amount of energy if the capacitance of middle capacitor 240 is smaller than the capacitance of bulk capacitor 250. Equation (2) shows that the charge Q stored on middle capacitor 240 is proportional to the capacitance C of middle capacitor 240 and proportional to the voltage V across middle capacitor 240. Equation (3) shows that the change or increment in voltage across bulk capacitor 250 is based on the ratio of capacitances of middle capacitor 240 and bulk capacitor 250 and the energy balance between capacitors 240 and 250.

$$\Delta V_{bulk} = \Delta V_{mid} \sqrt{\frac{C_{mid}}{C_{mid} + C_{bulk}}} \quad (3)$$

Controller 290 may be configured to detect a short circuit condition across one of switches 231-234 (e.g., primary switch failure) and either continue or cease the pre-charging operation in a forward direction, as shown in the example of FIGS. 2 and 3. For example, controller 290 may continue a pre-charging operation in the forward direction in response to detecting a short circuit condition across switch 232 or across switch 233. Controller 290 may cease or suppress a pre-charging operation in the forward direction in response to detecting a short circuit condition across switch 231 or across switch 234. The ability to control pre-charging circuit 220 in the event of a primary switch failure is not limited to pre-charging operation. For example, responsive to detecting a primary switch failure, controller 290 can isolate the components of electrical power system 200 to prevent high currents and power loss. Therefore, controller 290 can protect a power source from a short circuit, which can cause damage to the components of electrical power system 200 and to the power source. Electrical power system 200 may also include one or more snubber circuits and overvoltage protection devices such as metal oxide varistors.

A short circuit condition across switch 231 or 234 may result in the flow of power in the forward direction even if controller 290 attempts to deactivate all of switches 231-234. However, a short circuit condition across switch 232 or 233 may not necessarily result in the flow of power in the forward direction when controller 290 attempts to deactivate all of switches 231-234.

Thus, controller 290 may be configured to continue charging in the forward direction in response to determining a short circuit condition across switch 232 or 233. Controller 290 can stop a pre-charging process in the forward direction in response to determining a short circuit condition across switch 231 or 234. Moreover, controller 290 may be configured to continue charging in the reverse direction in response to determining a short circuit condition across switch 231 or 234. Controller 290 can stop a pre-charging process in the reverse direction in response to determining a short circuit condition across switch 232 or 233.

Figure 4:
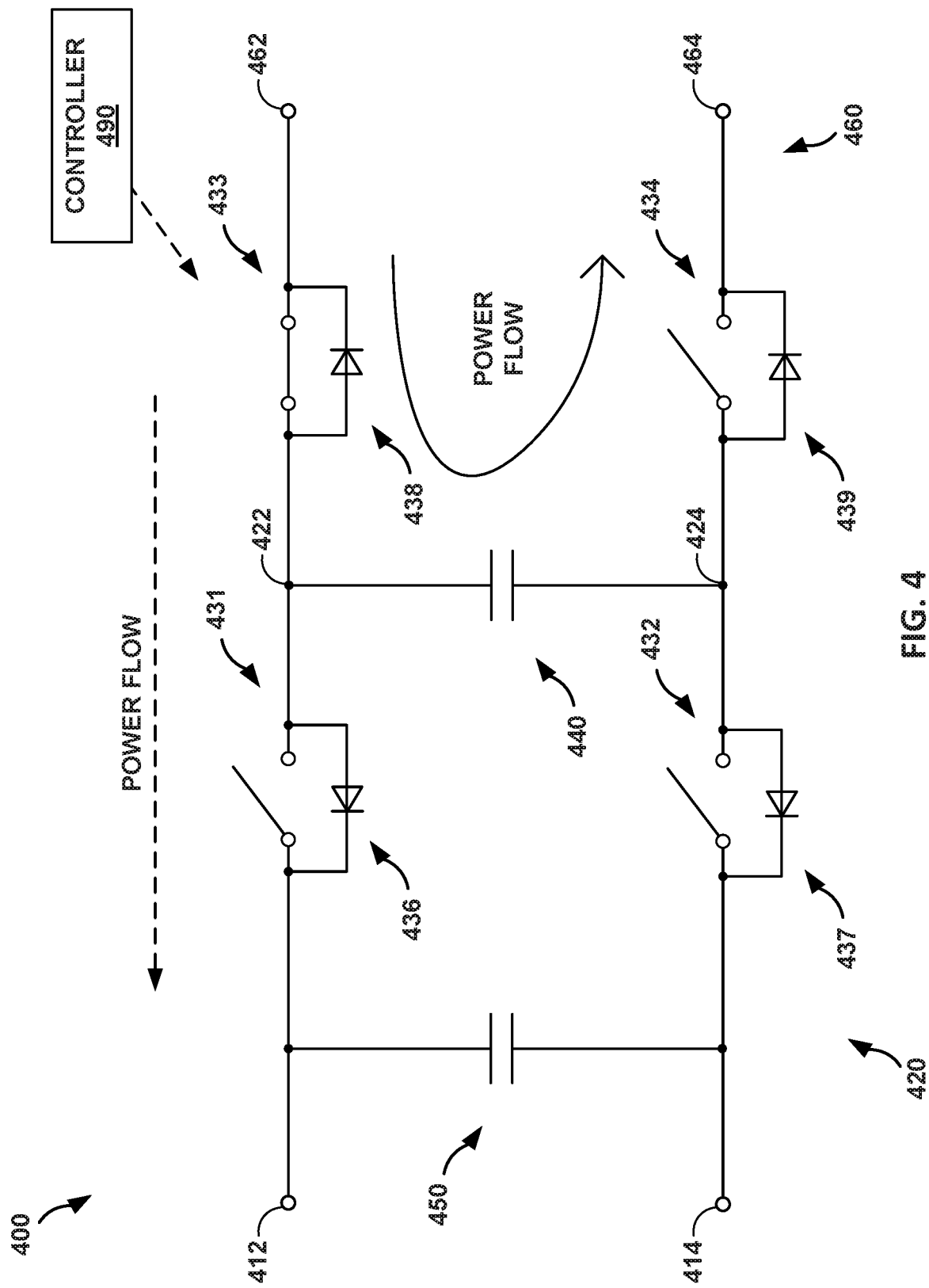
FIGS. 4 and 5 are schematic diagrams showing a reverse charging mode, in accordance with one or more techniques of this disclosure.
Figure 5:
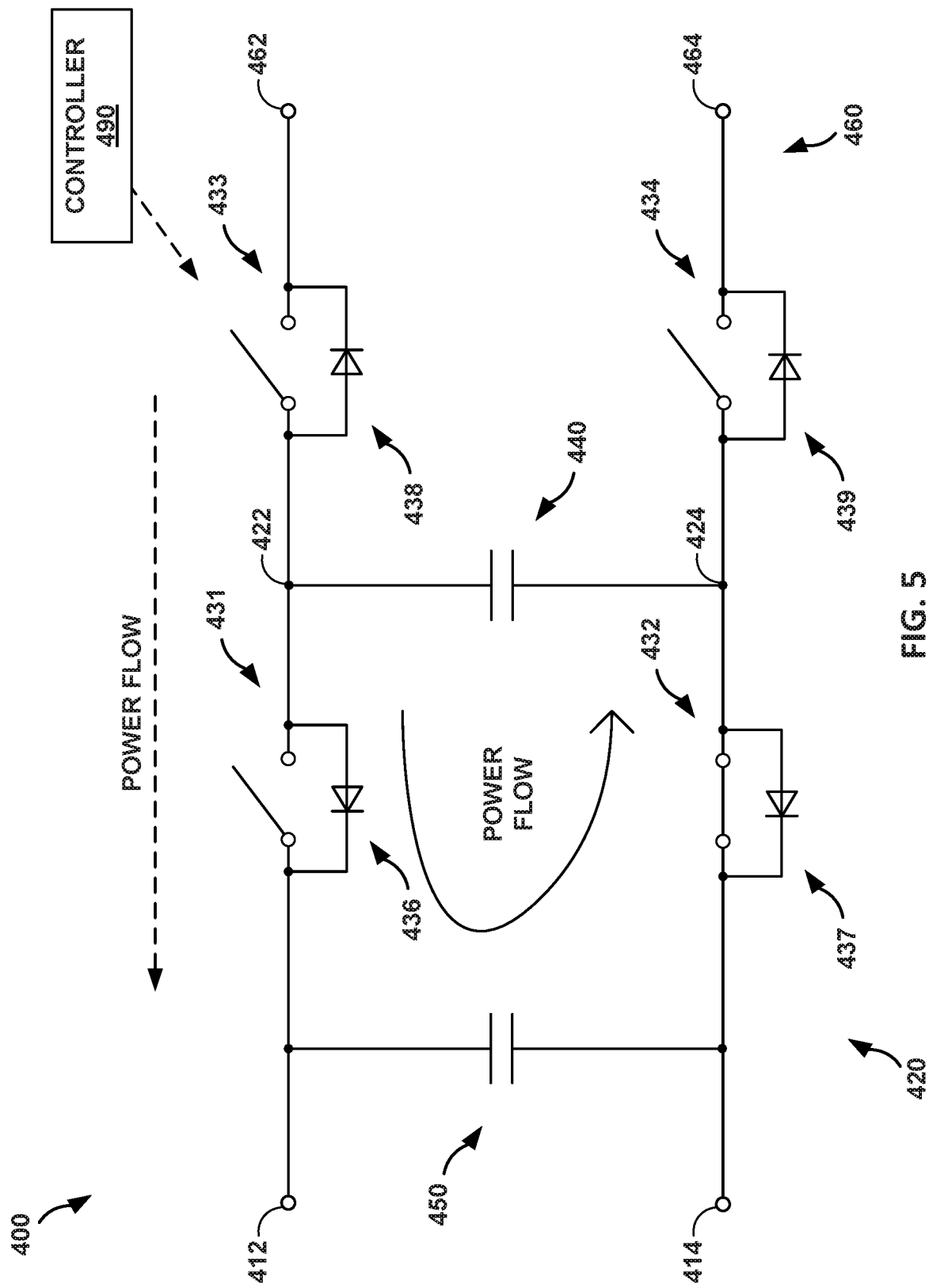

FIGS. 4 and 5 are schematic diagrams showing a reverse charging mode, in accordance with one or more techniques of this disclosure. As shown in the example of FIGS. 4 and 5, electrical power system 400 includes pre-charging circuit 420, bulk capacitor 450, differential bus 460, and controller 490. Pre-charging circuit 420 is coupled between nodes 412 and 414 on a first side and rails 462 and 464 on a second side. Nodes 412 and 414 may be coupled to a power source, a converter, and/or an electrical load.

Each of switches 431-434 is connected in parallel with a respective one of diodes 436-439. Diodes 436 and 437 may allow power to flow from middle capacitor 240 to nodes 412 and 414. Diodes 438 and 439 may allow power to flow from middle capacitor 440 to rails 462 and 464.

In some examples, electrical power system 400 may be configured for bi-directional power flow in a reverse charging mode. In examples in which controller 490 operates in the reverse charging mode, controller 490 may be configured to transfer energy from rails 462 and 464 to middle capacitor 440 and concurrently isolate middle capacitor 440 from nodes 412 and 414. As shown in the example of FIG. 4, controller 490 can transfer energy from rails 462 and 464 to middle capacitor 440 by activating switch 433. With switch 433 activated, power flows through switch 433 and node 422 to middle capacitor 440. On a return path, the power may flow back to low-side rail 464 through node 424 and diode 439. In some examples, controller 490 activates switch 434 when power flows through diode 439 to reduce the power dissipation in electrical power system 400. Controller 490 can isolate middle capacitor 440 from power source 410 by deactivating switches 431 and 432.

Controller 490 may be configured to transfer energy from middle capacitor 440 to bulk capacitor 450 and concurrently isolate middle capacitor 440 from differential bus 460. As shown in the example of FIG. 5, controller 490 can transfer energy from middle capacitor 440 to bulk capacitor 450 by activating switch 432. For example, controller 490 can activate switch 432 so that power flows from middle capacitor 440 through node 422 and diode 436 to bulk capacitor 450. In some examples, controller 490 activates switch 431 when power flows through diode 436 to reduce the power dissipation in electrical power system 400. On a return path, the power may flow back from bulk capacitor 450 to middle capacitor 440 through switch 432 and node 424. Controller 490 can isolate middle capacitor 440 from differential bus 460 by deactivating switches 433 and 434.

Controller 490 may be configured to detect a short circuit condition across one of switches 431-434 and either continue or cease the pre-charging operation in a reverse direction, as shown in the example of FIGS. 4 and 5. For example, controller 490 may continue a pre-charging operation in the reverse direction in response to detecting a short circuit condition across switch 431 or across switch 434. Controller 490 may cease or suppress a pre-charging operation in the reverse direction in response to detecting a short circuit condition across switch 432 or across switch 433.

A short circuit condition across switch 431 or 434 may result in the flow of power in the reverse direction even if controller 490 attempts to deactivate all of switches 431-434. However, a short circuit condition across switch 432 or 433 may not necessarily result in the flow of power in the reverse direction when controller 490 attempts to deactivate all of switches 431-434.

Figure 6:
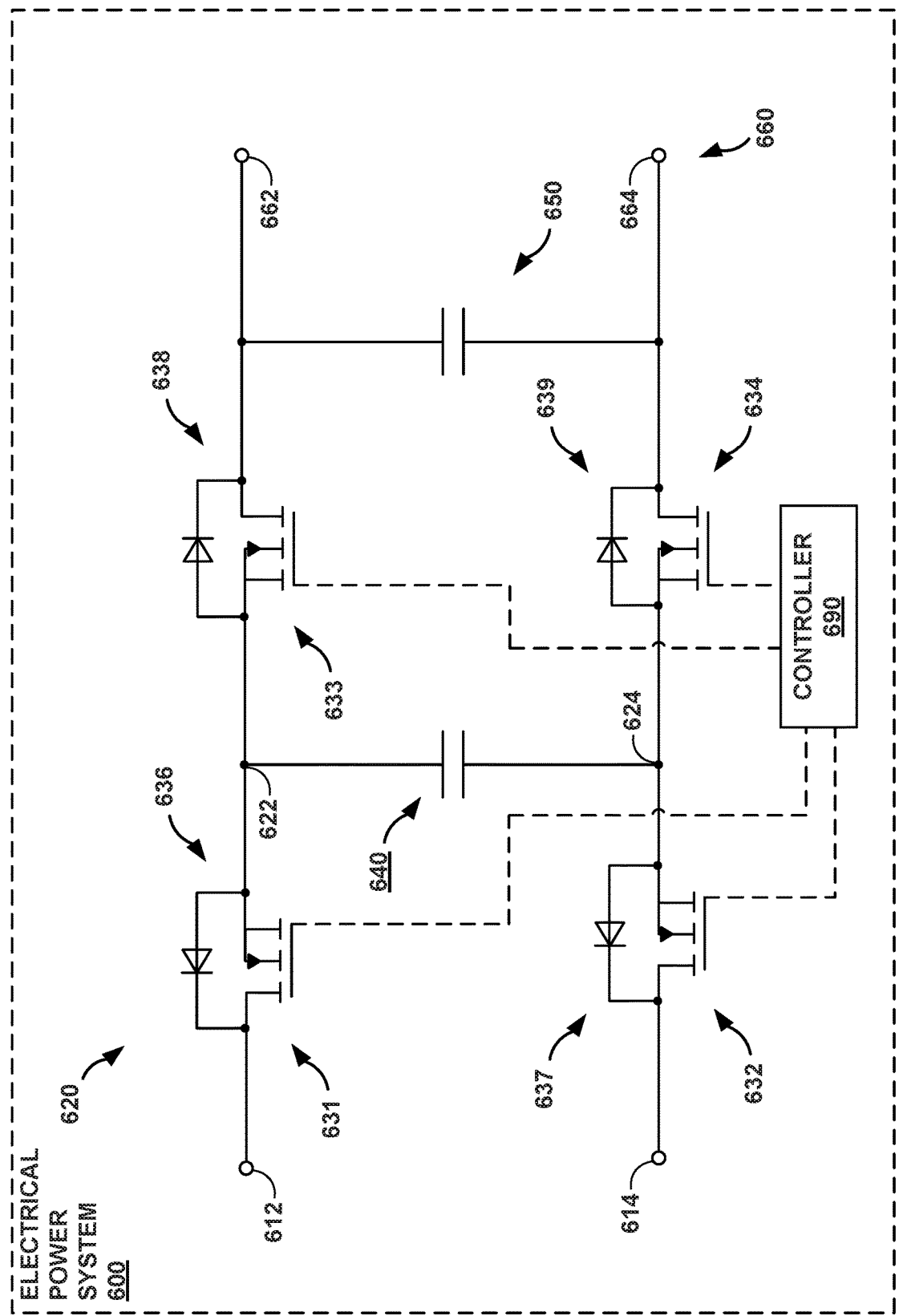
FIG. 6 is a schematic diagram showing a pre-charging circuit including n-channel metal-oxide-semiconductor field-effect transistors with antiparallel diodes, in accordance with one or more techniques of this disclosure.

FIG. 6 is a schematic diagram showing a pre-charging circuit 620 including n-channel metal-oxide-semiconductor field-effect transistors (MOSFETs) 631-634 with antiparallel diodes 636-639, in accordance with one or more techniques of this disclosure. Although FIG. 6 depicts switches 631-634 as n-channel MOSFETs, switches 631-634 may include any type of power switches such as, but not limited to, any type of field-effect transistor (FET), a p-channel MOSFET, a bipolar junction transistor (BJT), an insulated-gate bipolar transistor (IGBT), a high-electron-mobility transistor (HEMT), or another element that uses voltage for its control. Each of switches 631-634 can include one or more switches connected in series and/or one or more switches connected in parallel. In some examples, switches 631-634 may include other analog devices such as diodes and/or thyristors. Switches 631-634 may also include a freewheeling diode connected in parallel with a transistor to prevent reverse breakdown of the transistor (e.g., an antiparallel diode).

Each of switches 631-634 may include three terminals: two load terminals and a control terminal. The control terminal of each of switches 631-634 may be configured to receive control signals from controller 690. For MOSFET switches, each of switches 631-634 may include a drain terminal, a source terminal, and a gate terminal. For BJT switches, each of switches 631-634 may include a collector terminal, an emitter terminal, and a base terminal. Current may flow between the load terminals of switches 631-634, based on the voltage at control terminals. For example, electrical current may flow between nodes 612 and 622 based on the control signal that controller 690 delivers to the control terminal of switch 631.

As shown in the example of FIG. 6, the source terminal of switch 631 is coupled to the source terminal of switch 633 at node 622. The source terminals of switches 631 and 633 are coupled to middle capacitor 640 by node 622. The source terminal of switch 632 is coupled to the source terminal of switch 634 at node 624. The source terminals of switches 632 and 634 are coupled to middle capacitor 640 by node 624. Thus, electrical power system 600 is an example of a common-source configuration for pre-charging circuit 620. The drain terminal of switch 631 is coupled to node 612, and the drain terminal of switch 632 is coupled to node 614. The drain terminal of switch 633 is coupled to high-side rail 662 and bulk capacitor 650. The drain terminal of switch 634 is coupled to low-side rail 664 and bulk capacitor 650.

In examples in which switches 631-634 include IGBTs, the emitter terminal of switch 631 may be coupled to the emitter terminal of switch 633 at node 622. The emitter terminals of switches 631 and 633 may be coupled to middle capacitor 640 by node 622. The emitter terminal of switch 632 may be coupled to the emitter terminal of switch 634 at node 624. The emitter terminals of switches 632 and 634 may be coupled to middle capacitor 640 by node 624.

Electrical power system 600 includes diode 636 coupled in parallel with switch 631 and configured to conduct electricity from node 622 to node 612. Electrical power system 600 also includes diode 637 coupled in parallel with switch 632 and configured to conduct electricity from node 624 to node 614. In addition, electrical power system 600 includes diode 638 coupled in parallel with switch 633 and configured to conduct electricity from node 622 to high-side rail 662. Electrical power system 600 includes diode 639 coupled in parallel with switch 634 and configured to conduct electricity from node 624 to low-side rail 664.

Although switches 631 and 633 may be sufficient for isolating or connecting a power source to differential bus 660, switches 632 and 634 can help to isolate the components of electrical power system 600 in case of a fault. For example, controller 690 can isolate a fault at node 622 or 624 by deactivating one or more of switches 631-634. Controller 690 can isolate a fault on high-side rail 662 or low-side rail 664 by deactivating switch 633 and/or switch 634.

Figure 7:
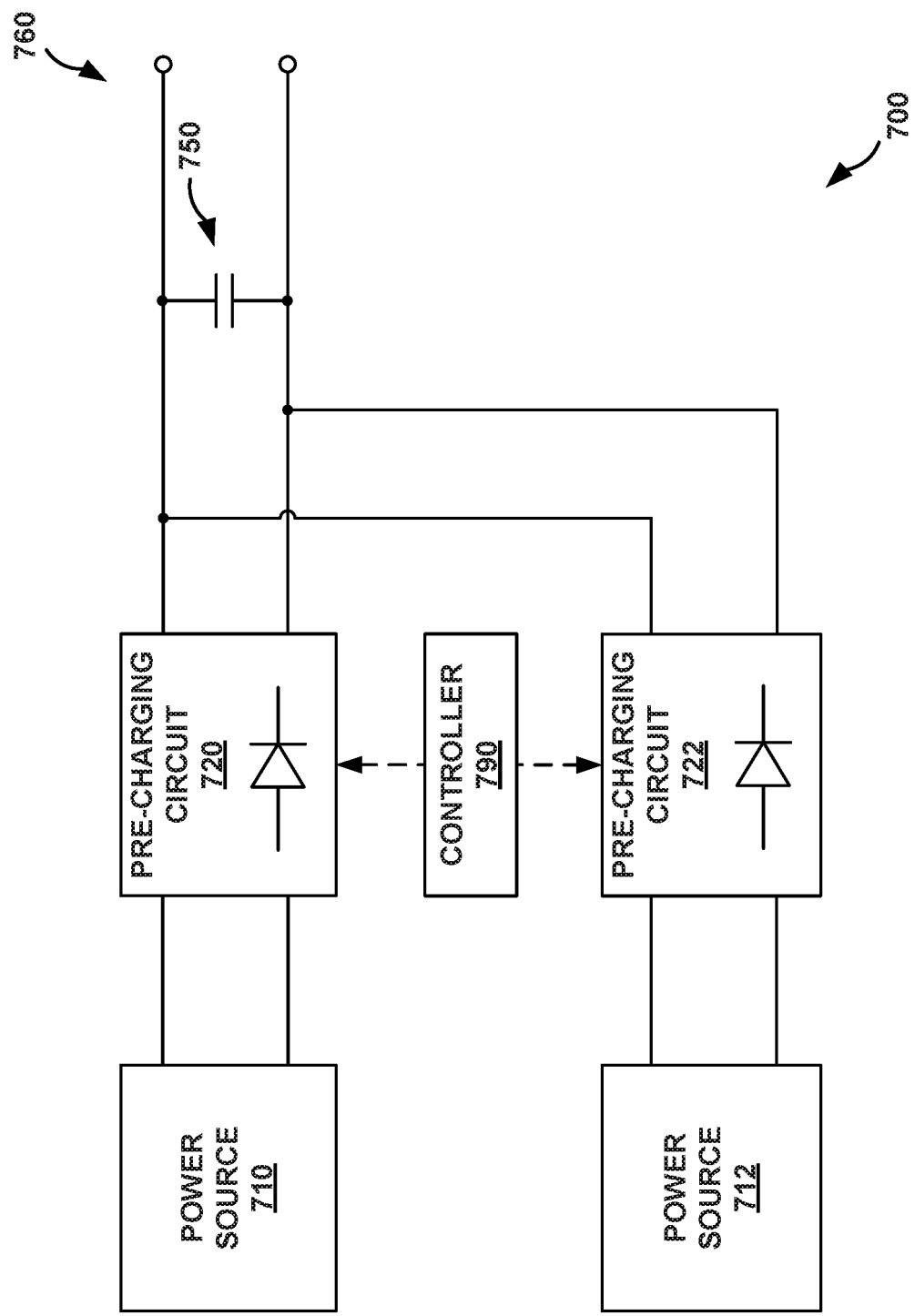
FIG. 7 is a conceptual block diagram showing a circuit arrangement for two pre-charging circuits, in accordance with one or more techniques of this disclosure.

FIG. 7 is a conceptual block diagram showing a circuit arrangement for two pre-charging circuits 720 and 722, in accordance with one or more techniques of this disclosure. Electrical power system 700 includes power sources 710 and 712, pre-charging circuits 720 and 722, bulk capacitors 750 and 752, and differential buses 760 and 762. In the example shown in FIG. 7, pre-charging circuit 720 is coupled to power source 710, pre-charging circuit 722 is coupled to power source 712. In some examples, electrical power system 700 includes an electrical load configured to receive power from differential bus 760. In such examples, power sources 710 and 712 may operate as redundant power sources. In the event of a fault at power source 710, controller 790 can deliver power to the electrical load via redundant power source 712.

Power source 710 can generate and deliver power to pre-charging circuit 720, and power source 712 can generate and deliver power to pre-charging circuit 722. Controller 790 can block the flow of power to bulk capacitor 750 by controlling the switches of pre-charging circuits 720 and 722. In examples in which controller 790 deactivates the switches of pre-charging circuit 720, bulk capacitor 750 may not receive power from power source 710. In examples in which controller 790 deactivates the switches of pre-charging circuit 722, bulk capacitor 750 may not receive power from power source 712.

Controller 790 can perform dynamic load management without a separate OR-ing device. One example of an OR-ing device is a diode that protects a system against an input power source fault condition. Electrical power system 700 may not include an OR-ing device to prevent the undesired flow of power between power sources 710 and 712. The structure of pre-charging circuits 720 and 722 removes the need for an OR-ing device due to the configuration of the switches of pre-charging circuits 720 and 722. In some examples, the antiparallel diodes of pre-charging circuits 720 and 722 prevent the undesired flow of power from bulk capacitor 750 back to power sources 710 and 712. In examples in which power source 710 fails, controller 790 can deactivate the switches of pre-charging circuit 720 to prevent power sharing between power sources 710 and 712.

A diode OR-ing device may allow current to flow in one direction only, thus isolating a fault on a differential bus from the redundant differential bus, allowing the electrical power system to run off the remaining redundant power source. Pre-charging circuit 720 and 722 can provide the same functionality as an OR-ing device, such that controller 790 can isolate a fault on differential bus 760 from differential bus 762.

Figure 8:
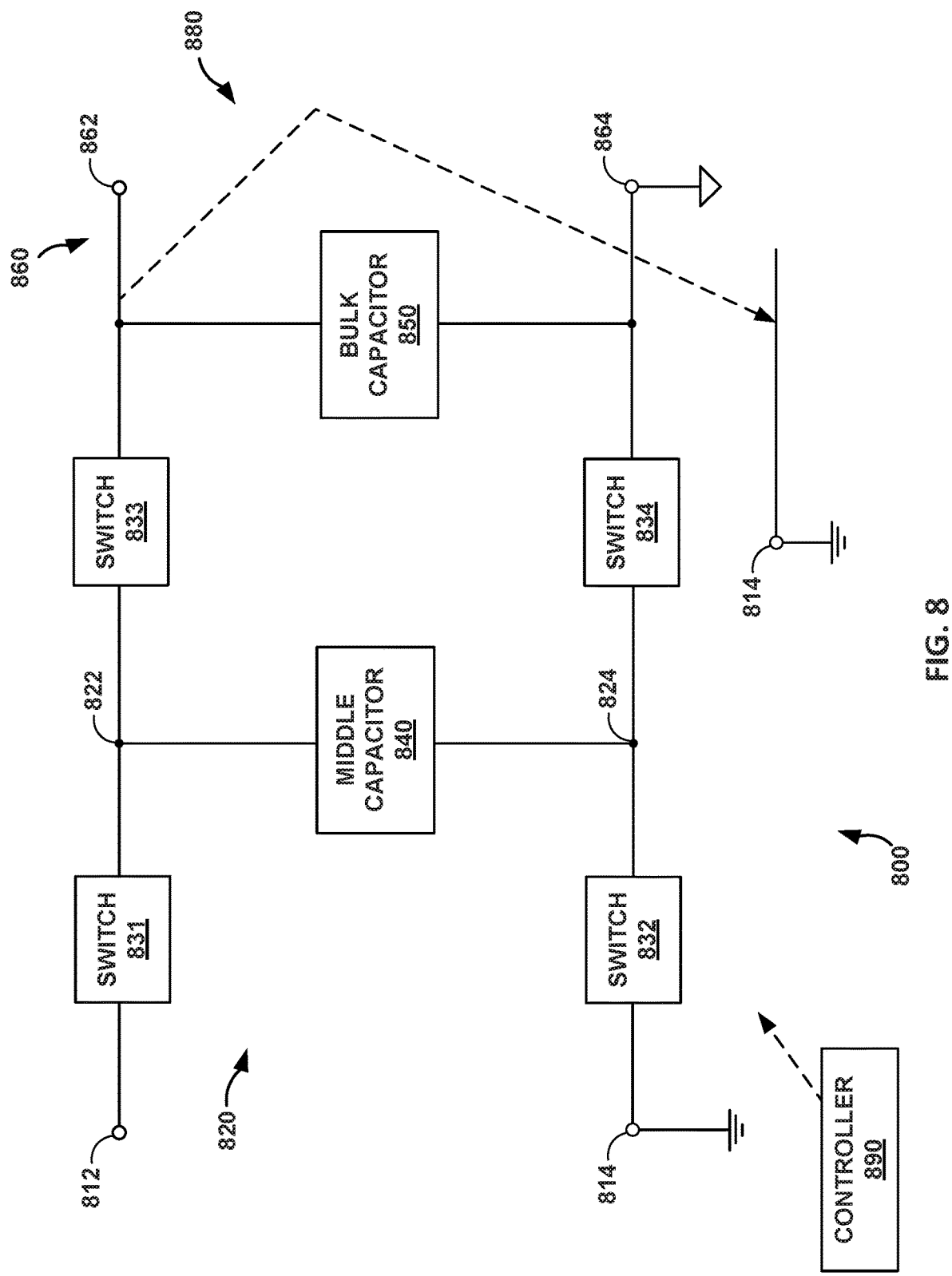
FIGS. 8 and 9 are conceptual block diagrams illustrating ground faults in a pre-charging circuit, in accordance with one or more techniques of this disclosure.
Figure 9:
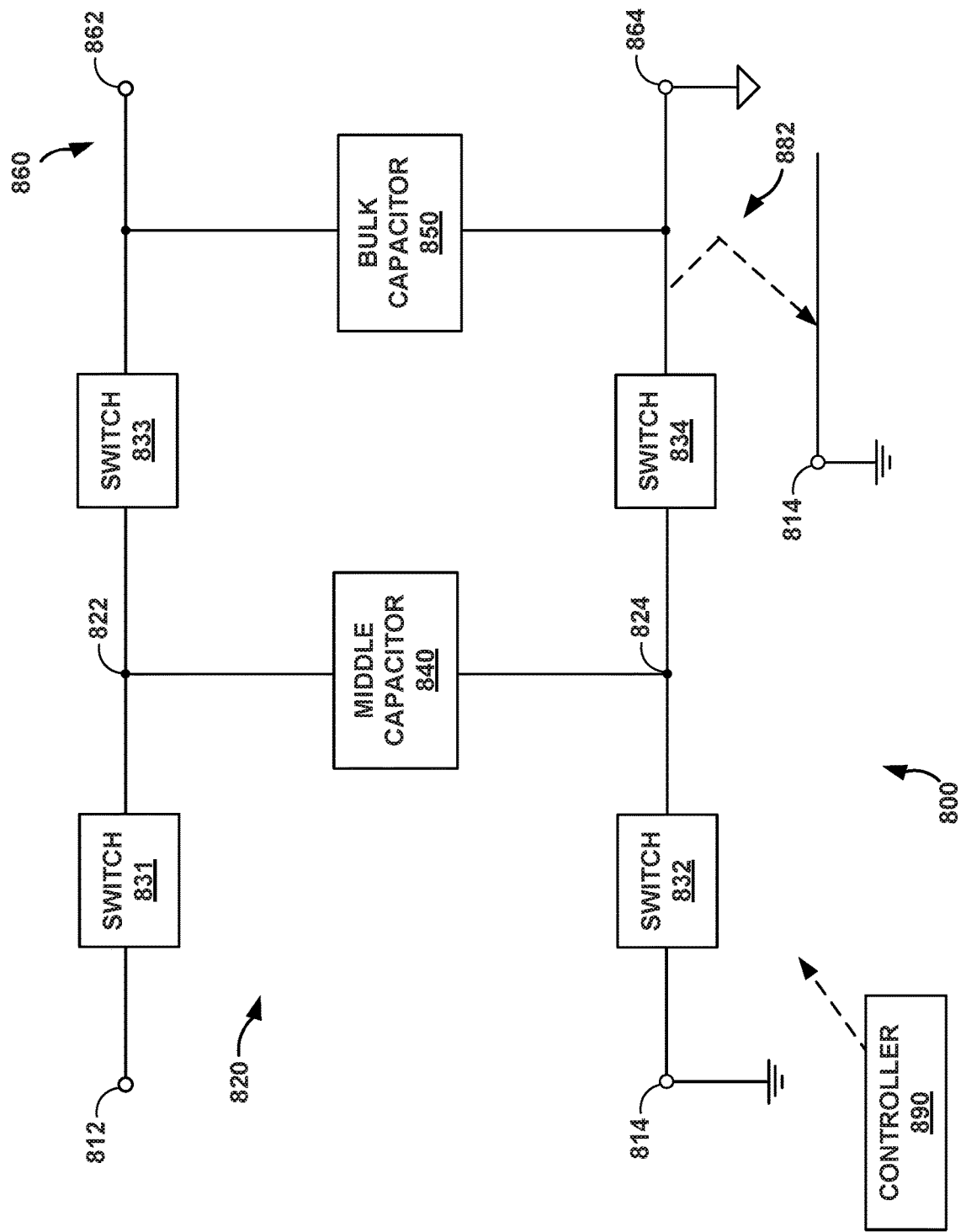

FIGS. 8 and 9 are conceptual block diagrams illustrating ground faults 880 and 882 in a pre-charging circuit 820, in accordance with one or more techniques of this disclosure. Pre-charging circuit 820 shown in FIG. 8 may also be referred to as an isolation circuit for isolating a power source and a load. An isolation circuit can allow for functionality such as fault detection, short circuit detection, reverse polarity detection, and OR-ing functionality (see, e.g., pre-charging circuits 720 and 722 shown in FIG. 7). FIG. 8 shows ground fault 880 occurring at high-side rail 862 to create a short condition between rail 862 and node 814. FIG. 9 shows ground fault 882 occurring at low-side rail 864 to create a short condition between rail 864 and node 814. Although FIGS. 8 and 9 show ground faults 882 and 884 to node 814, ground faults to other nodes or rails are also possible. For example, node 822 can be shorted to high-side rail 862 or low-side rail 864. In addition, node 824 can be shorted to high-side rail 862 or low-side rail 864. Additionally or alternatively, either of rails 862 or 864 can be independent (e.g., connected to node 814 through a high-impedance connection).

Controller 890 may be configured to detect ground fault 882 or detect ground fault 884. For example, controller 890 may be configured to receive a signal indicating the voltage level at either of rails 862 or 864, the voltage level at node 822, or the voltage level at node 824. Controller 890 can detect ground fault 882 or 884 by determining whether the voltage level at rail 862 or 864 is equal to the voltage level at node 814. Additionally or alternatively, controller 890 can detect ground fault 882 or 884 by determining whether the voltage level at rail 862 or 864 is less than a threshold voltage level or whether the voltage level at rail 862 or 864 is within a threshold range of the voltage level of node 814.

Controller 890 may be configured to monitor the voltage at each of the nodes in electrical power system 800. In addition, controller 890 may be configured to monitor the current through each of the components in electrical power system 800. Especially in an ungrounded system, controller 890 can determine a fault exists in response to detecting a significant difference between the current in the high-side components and the current in the low-side components. Controller 890 may be configured to disconnect the positive and negative rails to prevent feeding current into the fault.

Responsive to detecting ground fault 882 or 884, controller 890 may be configured to deactivate switches 831-834. Controller 890 can isolate ground fault 882 or 884 from nodes 812 and 814 and from differential bus 860 by deactivating switches 831-834. Isolating ground fault 882 or 884 may be preferable to a controller with bus breaking capability for, e.g., high-side rail 864.

The power source of electrical power system 800 may be isolated from bulk capacitor 850. For example, the ground symbol at node 814 and the ground coupled to low-side rail 864 are different, as shown in FIGS. 8 and 9. Node 814 may be isolated from low-side rail 864. Node 812 may also be isolated from high-side rail 862.

Controller 890 may be configured to monitor the performance and status of pre-charging circuit 820 by diagnosing ground faults and implementing control solutions. By monitoring signals from middle capacitor 850, controller 890 can also have prognosis capability for future issues and events in electrical power system 800. For example, controller 890 can diagnose hard faults such as short circuits that may occur due to a degraded capacitor. Controller 890 can determine that a component of system 800 is deteriorating in response to determining that an increase over time in the leakage current in system 800, in response to determining a change in capacitance over time, or in response to determining an increase over time in the current difference between high-side rail 862 and low-side rail 864. Controller 890 can protect the electrical power system by isolating differential bus 860 independently in case of a short circuit condition or one of ground faults 882 and 884. For example, controller 890 can measure the discharge time of middle capacitor 820 by starting a timer when controller 890 activates switch 834 and stopping the timer when middle capacitor 840 is discharged. Controller 890 can detect that middle capacitor 840 is discharged by determining that the voltage across middle capacitor 840 is within a threshold range or a threshold difference of the voltage across bulk capacitor 850.

Controller 890 can determine an estimated capacitance of bulk capacitor 850 based on the discharge time of middle capacitor 840. The discharge time of middle capacitor 840 is related to the time constant of the discharge loop that includes capacitors 840 and 850. The capacitance of middle capacitor 840 is known and may be relatively constant. Thus, controller 890 can determine the capacitance or impedance of bulk capacitor 850 based on the discharge time of middle capacitor 840. Using the capacitance or impedance of bulk capacitor 850, controller 890 can monitor the health and estimate the useful life of bulk capacitor 850. Bulk capacitor 850 may have a relatively high failure rate, as compared to the other components in electrical power system 800.

Controller 890 can determine a short circuit condition in bulk capacitor 850 in response to determining that the discharge time of middle capacitor 840 is less than a threshold time duration. A short circuit condition in bulk capacitor 850 can cause the capacitance of bulk capacitor 850 to decrease, which will reduce the discharge time of middle capacitor 840. Thus, a very short discharge time for middle capacitor 840 indicates a possible short condition in bulk capacitor 850. In response to determining a short condition across bulk capacitor 850 or that the capacitance of bulk capacitor 850 is less than a threshold level, controller 890 can generate an alert signal indicating that bulk capacitor 850 needs replacement. Controller 890 can also cease a pre-charging operation in response to determining a short condition across bulk capacitor 850 or that the capacitance of bulk capacitor 850 is less than a threshold level.

In addition, controller 890 may be configured to detect a reverse polarity on middle capacitor 840 after transferring energy to middle capacitor 840 from a power source. A reverse polarity may occur when the voltage level at node 824 is higher than the voltage level at node 822. For example, controller 890 can receive signals indicating the voltage levels at nodes 822 and 824 and determine whether the voltage level at node 824 is greater than the voltage level at node 822. Responsive to determining that the voltage across middle capacitor 840 has a reverse polarity, controller 890 may be configured to refrain from transferring energy from middle capacitor 840 to bulk capacitor 850. Controller 890 can refrain from transferring energy between capacitors 840 and 850 by deactivating switches 833 and 834. Bulk capacitor 850 may be a uni-directional electrolytic capacitor, and a reverse polarity voltage may cause damage to bulk capacitor 850. Controller 890 can protect bulk capacitor 850 and a downstream converter from an accidental reverse polarity fault.

Figure 10:
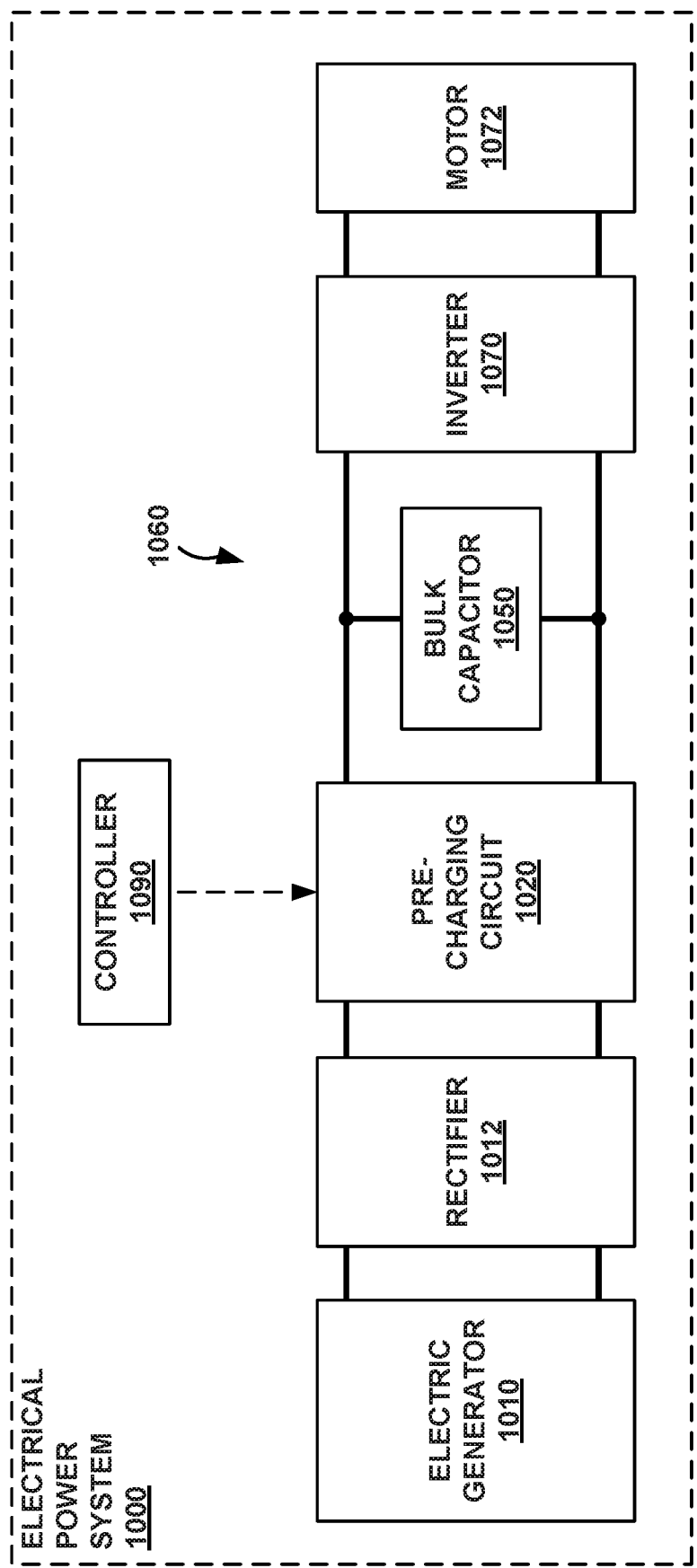
FIG. 10 is a conceptual block diagram illustrating power flow from an electric generator through a pre-charging circuit to a motor, in accordance with one or more techniques of this disclosure.

FIG. 10 is a conceptual block diagram illustrating power flow from an electric generator 1010 through a pre-charging circuit 1020 to a motor 1072, in accordance with one or more techniques of this disclosure. Electrical power system 1000 includes electric generator 1010, rectifier 1012, pre-charging circuit 1020, bulk capacitor 1050, differential bus 1060, inverter 1070, motor 1072, and controller 1090.

Electric generator 1010 can generate power based on mechanical power such as a rotating shaft. Electric generator 1010 may generate and deliver AC power to rectifier 1070. Rectifier 1012 can include an AC/DC converter that converts the AC electricity received from electric generator 1010 to DC electricity and delivers the DC electricity to pre-charging circuit 1020.

Inverter 1070 can include a DC/AC converter that receives DC power from differential bus 1060 and generates AC power. In some examples, inverter 1070 can generate multiphase AC power for a multiphase electrical load such as motor 1072 (e.g., a three-phase AC motor). Motor 1072 is an example of an electrical load configured to receive electrical power converted by inverter 1070.

In some examples, electrical power system 1000 also includes an electromagnetic interference (EMI) filter. The EMI filter may be coupled to rectifier 1012 and configured to filter signals and frequencies that cause EMI from the power generated by electric generator 1010. The EMI filter can include one or more capacitors (e.g., X-capacitors) and one or more inductors configured to remove common-mode and differential-mode noise. The middle capacitor of pre-charging circuit 1020 may function as part of the EMI filter for electrical power system 1000. The capacitance of middle capacitor can be chosen to have the value of an EMI filter capacitor. Thus, the inclusion of pre-charging circuit 1020 in electrical power system 1000 can mean that fewer additional components are needed for the EMI filter.

Figure 11:
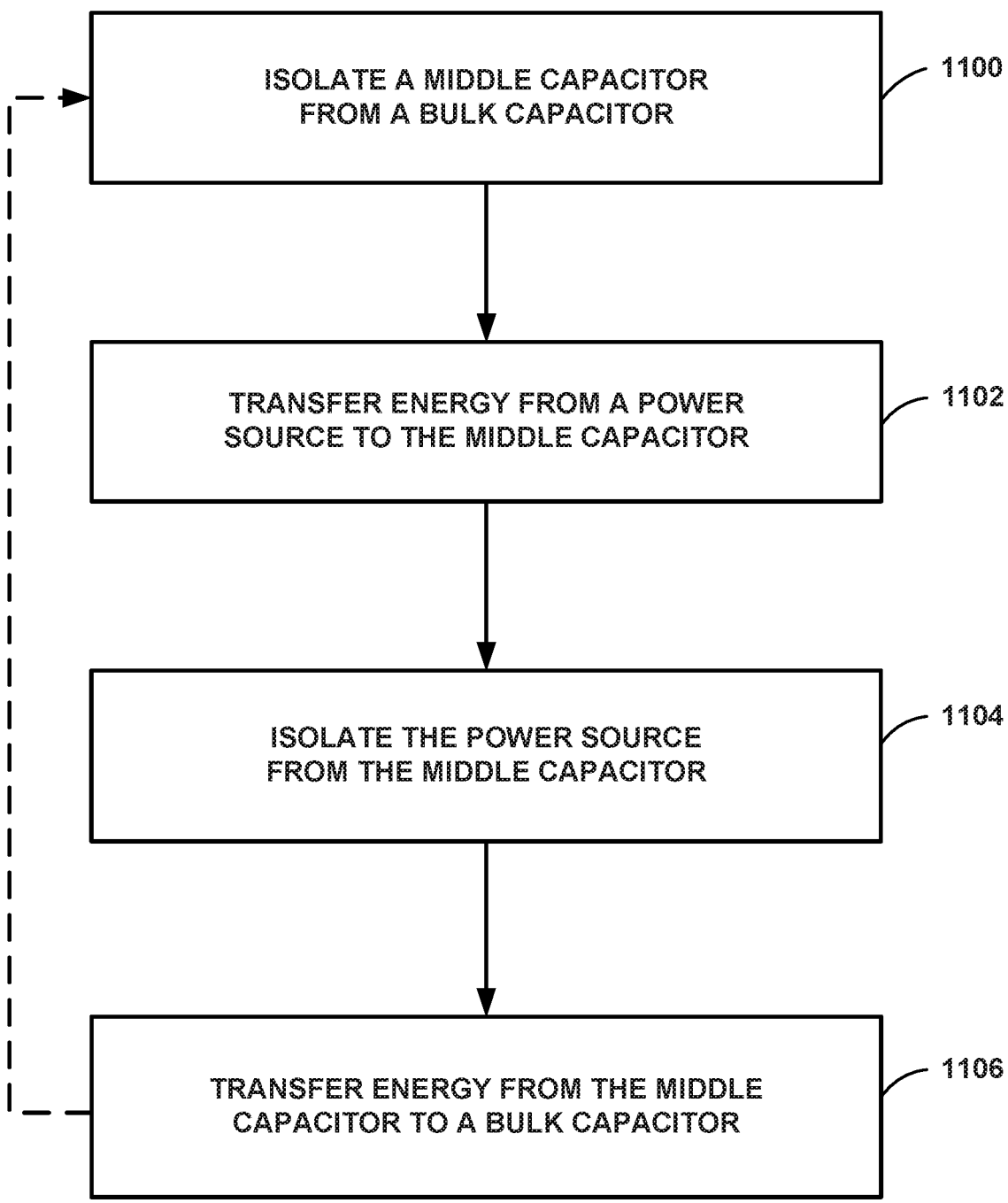
FIGS. 11 and 12 are flowcharts illustrating example processes for controlling a pre-charging circuit, in accordance with one or more techniques of this disclosure.
Figure 12:
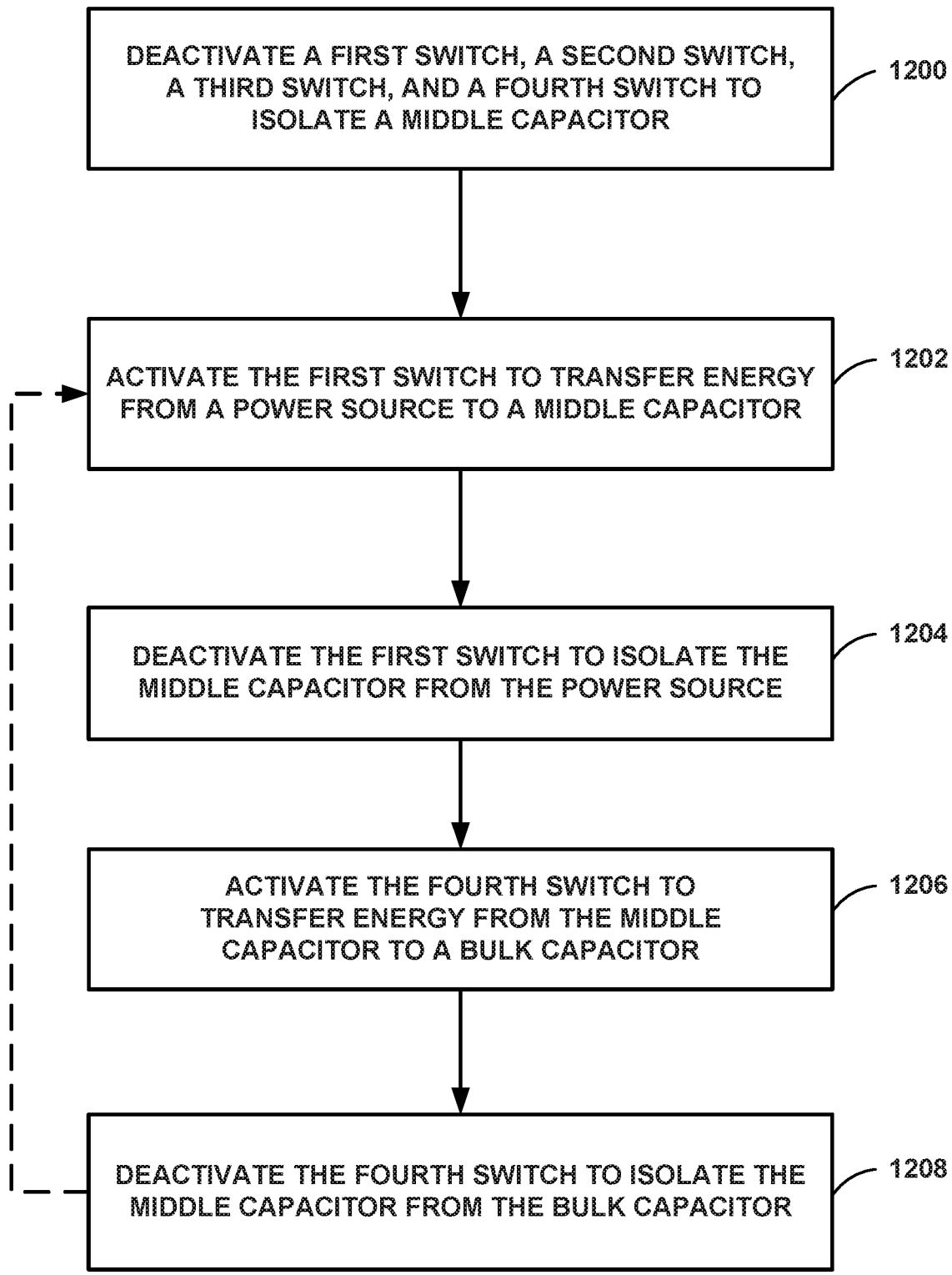

FIGS. 11 and 12 are flowcharts illustrating example processes for controlling a pre-charging circuit, in accordance with one or more techniques of this disclosure. The techniques of FIGS. 11 and 12 are described with reference to controller 190 shown in FIG. 1, although other components may exemplify similar techniques. FIG. 11 includes operations 1100 through 1106, and FIG. 12 includes operations 1200 through 1208. Operations 1100 through 1106 and operations 1200 through 1208 may be performed in a different order than what is shown in FIGS. 11 and 12. Additional operations, beyond operations 1100 through 1106 and operations 1200 through 1208, may be performed in other examples. Controller 190 may be configured to perform any of operations 1100 through 1106 and any of operations 1200 through 1208, or any and all other techniques described with respect to FIGS. 11 and 12.

In the example of FIG. 11, controller 190 isolates middle capacitor 140 from bulk capacitor 150 (1100). Controller 190 can isolate middle capacitor 140 from bulk capacitor 150 by deactivating switches 133 and 134. In some examples, controller can prevent the flow of energy from middle capacitor 140 to bulk capacitor 150 by deactivating switch 134. The status of switch 133 may not affect the flow of energy due to the orientation of a diode connected in parallel with switch 133.

In the example of FIG. 11, controller 190 transfers energy from power source 110 to middle capacitor 140 (1102). Controller 190 can transfer energy from power source 110 to middle capacitor 140 by activating switches 131 and 132. In some examples, controller can transfer energy from power source 110 to middle capacitor 140 by activating switch 131. The status of switch 132 may not affect the flow of energy due to the orientation of a diode connected in parallel with switch 132. The flow of energy from power source 110 to middle capacitor 140 may occur through a loop including power source 110 and middle capacitor 140 and switches 131 and 132 (see, e.g., FIG. 2).

In the example of FIG. 11, controller 190 isolates power source 110 from middle capacitor 140 (1104). Controller 190 can isolate power source 110 from middle capacitor 140 by deactivating switches 131 and 132. In some examples, controller can prevent the flow of energy from power source 110 to middle capacitor 140 by deactivating switch 131.

In the example of FIG. 11, controller 190 transfers energy from middle capacitor 140 to bulk capacitor 150 (1106). Controller 190 can transfer energy from middle capacitor 140 to bulk capacitor 150 by activating switches 133 and 134. In some examples, controller can transfer energy from middle capacitor 140 to bulk capacitor 150 by activating switch 134. The flow of energy from middle capacitor 140 to bulk capacitor 150 may occur through a loop including capacitors 140 and 150 and switches 133 and 134 (see, e.g., FIG. 3).

By performing operations 1100 through 1106, controller 190 can soft-charge bulk capacitor 150. Controller 190 can perform line-isolated charging of bulk capacitor 150 to introduce relatively small amounts of energy to bulk capacitor 150 during each charging cycle. Thus, each time controller 190 activates switch 134 in operation 1106, a relatively small amount of energy may flow from middle capacitor 140 to bulk capacitor 150. In contrast, if controller 190 activates all of switches 131-134 during a startup mode, bulk capacitor 150 may experience a large inrush current, which can cause damage to bulk capacitor 150 and/or switches 131-134.

After transferring energy from middle capacitor 140 to bulk capacitor 150, controller 190 can return to operation 1100 by isolating middle capacitor 140 from bulk capacitor 150. Controller 190 may continue to perform operations 1100 through 1106 until controller 190 determines that the voltage across bulk capacitor 150 is greater than a threshold level. Responsive to determining that the voltage across bulk capacitor 150 is greater than the threshold level, controller 190 may cease performing operations 1100 through 1106.

After pre-charging bulk capacitor 150, controller 190 may enable conversion of the energy filtered by bulk capacitor 150 by converter 170. In some examples, controller 190 is configured to control the switches of converter 170. Additionally or alternatively, controller 190 may be configured to command another controller to cause converter 170 to begin converting the energy filtered by bulk capacitor 150. The other controller may be configured to monitor the voltage across bulk capacitor 150 or across differential bus to determine whether to cause converter 170 to begin converting the energy filtered by bulk capacitor 150.

In the example of FIG. 12, controller 190 deactivates switches 131-134 to isolate middle capacitor 140 (1200). Controller 190 can deactivate switches 131-134 by delivering control signals to the control terminals of switches 131-134. When switch 131, for example, is deactivated, switch 131 may prevent electricity from flowing between nodes 112 and 122.

In the example of FIG. 12, controller 190 activates switch 131 to transfer energy from power source 110 to middle capacitor 140 after deactivating switches 131-134 (1202). When switch 131 is activated, energy can flow from power source 110 through switch 131 to middle capacitor 140. On a return path, the energy can flow through a diode connected in parallel with switch 132 to power source 110. Controller 190 may be configured to activate switch 131 and concurrently isolate middle capacitor 140 from bulk capacitor 150 so that energy does not flow from power source 110 or middle capacitor 140 to bulk capacitor 150.

In the example of FIG. 12, controller 190 deactivates switch 131 to isolate middle capacitor 140 from power source 110 after activating switch 131 (1204). Before transferring energy from middle capacitor 140 to bulk capacitor 150, controller 190 may be configured to isolate middle capacitor 140 from power source 110 by deactivating switch 131. Controller 190 can prevent the flow of energy from power source 110 to middle capacitor 140 by deactivating switch 131.

In the example of FIG. 12, controller 190 activates switch 134 to transfer energy from middle capacitor 140 to bulk capacitor 150 after deactivating switch 131 (1206). When switch 134 is activated, energy can flow from middle capacitor 140 through a diode connected in parallel with switch 133 to bulk capacitor 150. On a return path, the energy can flow through switch 134 to middle capacitor 140. Controller 190 may be configured to activate switch 134 and concurrently isolate middle capacitor 140 from power source 110 so that energy does not flow from power source 110 to middle capacitor 140 or bulk capacitor 150.

In the example of FIG. 12, controller 190 deactivates switch 134 to isolate middle capacitor 140 from bulk capacitor 150 after activating switch 134 (1208).

After deactivating switch 134, controller 190 can return to operation 1202 by activating switch 131. Controller 190 may continue to perform operations 1202 through 1208 until controller 190 determines that the voltage across bulk capacitor 150 is greater than a threshold level. Responsive to determining that the voltage across bulk capacitor 150 is greater than the threshold level, controller 190 may cease performing operations 1200 through 1208.

Controller 190 may be configured to activate all of switches 131-134 after determining that the voltage across bulk capacitor 150 is greater than the threshold level. Activating all of switches 131-134 allows energy to flow between power source 110 and middle capacitor 140 and between middle capacitor 140 and bulk capacitor 150. When the voltage across nodes 112 and 114 is within a threshold range of the voltage across rails 162 and 164, the electrical currents throughout electrical power system 100 may remain within an acceptable range.

The following numbered examples demonstrate one or more aspects of the disclosure.

Example 1

An electrical power system includes a differential bus including a high-side rail and a low-side rail, a power source configured to generate power, and a bulk capacitor coupled between the high-side rail and the low-side rail, the bulk capacitor configured to filter the power generated by the power source. The electrical power system also include a converter configured to convert the power filtered by the bulk capacitor. The electrical power system further includes a pre-charging circuit including one or more switches and a middle capacitor, the pre-charging circuit configured to pre-charge the bulk capacitor.

Example 2

The electrical power system of example 1, where the pre-charging circuit is configured to pre-charge the bulk capacitor prior to enabling conversion of the power by the converter.

Example 3

The electrical power system of any combination of example 1 or 2, where the one or more switches include a first switch coupled to a first node of the power source and a second switch coupled to a second node of the power source.

Example 4

The electrical power system of any combination of examples 1-3, where the one or more switches include a third switch coupled to the high-side rail, and a fourth switch coupled to the low-side rail.

Example 5

The electrical power system of any combination of examples 1-4, where a first node of the middle capacitor is coupled between the first switch and the third switch.

Example 6

The electrical power system of any combination of examples 1-5, a second node of the middle capacitor is coupled between the first second switch and the third fourth switch.

Example 7

The electrical power system of any combination of examples 1-6, further including a controller configured to activate and deactivate the one or more switches to transfer energy from the power source to the middle capacitor and isolate the middle capacitor from the bulk capacitor.

Example 8

The electrical power system of any combination of examples 1-7, further including a controller configured to activate and deactivate the one or more switches to transfer energy from the middle capacitor to the bulk capacitor and isolate the middle capacitor from the power source.

Example 9

The electrical power system of any combination of examples 1-8, where the one or more switches include a first switch coupled between the power source and the middle capacitor and a second switch coupled between the middle capacitor and the differential bus.

Example 10

The electrical power system of any combination of examples 3-9, further including a controller configured to transfer energy from the power source to the middle capacitor at least in part by activating the first switch and deactivating the second switch.

Example 11

The electrical power system of any combination of examples 3-10, further including a controller configured to transfer energy from the power source to the middle capacitor at least in part by deactivating the first switch and activating the second switch.

Example 12

The electrical power system of any combination of examples 3-11, further including a controller configured to deactivate the first switch, the second switch, the third switch, and the fourth switch. The controller is configured to activate the first switch after deactivating the first switch, the second switch, the third switch, and the fourth switch. The controller is configured to deactivate the first switch after activating the first switch, activate the fourth switch after deactivating the first switch, and deactivate the fourth switch after activating the fourth switch.

Example 13

The electrical power system of example 12, further including a controller configured to activate the first switch after deactivating the fourth switch.

Example 14

The electrical power system of any combination of examples 3-13, further including a controller configured to determine a short circuit condition in the third switch and suppress operation in a reverse charging mode in response to determining the short circuit condition in the third switch.

Example 15

The electrical power system of any combination of examples 1-14, further including a controller configured to measure a discharge time of the middle capacitor and determine an estimated capacitance of the bulk capacitor based on the discharge time of the middle capacitor.

Example 16

The electrical power system of any combination of examples 1-15, further including a controller configured to measure a discharge time of the middle capacitor and determine whether the discharge time is less than a threshold level. The controller is configured to determine a short circuit condition in the bulk capacitor in response to determining that the discharge time is less than the threshold time duration.

Example 17

The electrical power system of any combination of examples 1-16, further including a controller configured to determine whether a voltage across the middle capacitor has a reverse polarity after transferring energy from the power source to the middle capacitor. The controller is configured to refrain from transferring energy from the middle capacitor to the bulk capacitor in response to determining that the voltage across the middle capacitor has the reverse polarity.

Example 18

The electrical power system of any combination of examples 1-17, where the bulk capacitor is a first bulk capacitor, the electrical power system further including a second bulk capacitor coupled across the power source and a controller is configured to deactivate the first switch, the second switch, the third switch, and the fourth switch. The controller is configured to activate the third switch after deactivating the first switch, the second switch, the third switch, and the fourth switch. The controller is configured to deactivate the third switch after activating the third switch, activate the second switch after deactivating the third switch, and deactivate the second switch after activating the second switch.

Example 19

The electrical power system of any combination of examples 1-18, where the bulk capacitor is a first bulk capacitor, the electrical power system further including a second bulk capacitor coupled across the power source and a controller configured to activate and deactivate the one or more switches to transfer energy from the first bulk capacitor to the middle capacitor and isolate the middle capacitor from the second bulk capacitor. The controller is configured to activate and deactivate the one or more switches to transfer energy from the middle capacitor to the second bulk capacitor and isolate the middle capacitor from the first bulk capacitor.

Example 20

The electrical power system of any combination of examples 3-19, further including a controller configured to detect a ground fault at the high-side rail or at the low-side rail and deactivate the first switch, the second switch, the third switch, and fourth switch.

Example 21

The electrical power system of any combination of examples 3-20, where a source terminal of the first switch is coupled to a source terminal of the third switch.

Example 22

The electrical power system of any combination of examples 3-21, where a source terminal of the second switch is coupled to a source terminal of the fourth switch.

Example 23

The electrical power system of any combination of examples 3-22, where the source terminal of the first switch and the source terminal of the third switch are coupled to a first node of the middle capacitor, and Example 24

The electrical power system of any combination of examples 3-23, where the source terminal of the second switch and the source terminal of the fourth switch are coupled to a second node of the middle capacitor.

Example 25

The electrical power system of any combination of examples 3-24, where a drain terminal of the first switch is coupled to a first node of the power source, a drain terminal of the second switch is coupled to a second node of the power source, a drain terminal of the third switch is coupled to the high-side rail and the bulk capacitor, and a drain terminal of the fourth switch is coupled to the low-side rail and the bulk capacitor.

Example 26

The electrical power system of any combination of examples 3-25, the first switch includes a first n-channel metal-oxide-semiconductor field-effect transistor and a first antiparallel diode, and the second switch includes a second n-channel metal-oxide-semiconductor field-effect transistor and a second antiparallel diode.

Example 27

The electrical power system of any combination of examples 3-26, further including a first diode coupled in parallel with the first switch and configured to conduct electricity from the first node of the middle capacitor to a first node of the power source.

Example 28

The electrical power system of any combination of examples 3-27, further including a second diode coupled in parallel with the second switch and configured to conduct electricity from the second node of the middle capacitor to a second node of the power source.

Example 29

The electrical power system of any combination of examples 3-28, further including a third diode coupled in parallel with the third switch and configured to conduct electricity from a first node of the middle capacitor to the high-side rail.

Example 30

The electrical power system of any combination of examples 3-29, further including a fourth diode coupled in parallel with the fourth switch and configured to conduct electricity from a second node of the middle capacitor to the low-side rail.

Example 31

The electrical power system of any combination of examples 1-30, where the middle capacitor includes a metallized film capacitor.

Example 32

The electrical power system of any combination of examples 1-31, where the middle capacitor includes a self-healing, non-polarized capacitor.

Example 33

The electrical power system of any combination of examples 1-32, where a capacitance of the middle capacitor is between one nanofarad and ten microfarads.

Example 34

The electrical power system of any combination of examples 1-33, where a capacitance of the bulk capacitor is between two hundred microfarads and five millifarads.

Example 35

The electrical power system of any combination of examples 1-34, where the middle capacitor is a first middle capacitor, the bulk capacitor is a first bulk capacitor, the converter is a first converter, the pre-charging circuit is a first pre-charging circuit, the one or more switches are a first set of one or more switches, and the electrical power system further includes a second differential bus including a second high-side rail and a second low-side rail. The electrical power system also includes a second bulk capacitor coupled between the second high-side rail and the second low-side rail, the second bulk capacitor configured to filter the power provided by the power source. The electrical power system includes a second converter configured to convert the power filtered by the second bulk capacitor and a second pre-charging circuit including one or more switches and a second middle capacitor, the second pre-charging circuit configured to perform pre-charging of the second bulk capacitor prior to enabling conversion of the power by the second converter.

Example 36

The electrical power system of any combination of examples 3-33, where the middle capacitor is a first middle capacitor, the bulk capacitor is a first bulk capacitor, and the electrical power system further includes a second differential bus including a second high-side rail and a second low-side rail. The electrical power system also includes a second bulk capacitor coupled between the second high-side rail and the second low-side rail. The electrical power system further includes a fifth switch coupled to the first high-side rail, a sixth switch coupled to the first low-side rail, a seventh switch coupled to the second high-side rail, and an eighth switch coupled to the second low-side rail. The electrical power system includes a second middle capacitor, where a first node of the second middle capacitor is coupled between the fifth switch and the sixth switch, and a second node of the second middle capacitor is coupled between the seventh switch and the eighth switch.

Example 37

The electrical power system of any combination of examples 1-36, further including an electromagnetic interference filter circuit including one or more inductors and the middle capacitor.

Example 38

The electrical power system of any combination of examples 1-37, where the power source is decoupled from the converter before a pre-charging process.

Example 39

The electrical power system of any combination of examples 1-38, further including an electrical load configured to receive electrical power converted by the converter.

Example 40

The electrical power system of any combination of examples 1-39, where the power source includes an electric generator configured to generate alternating-current electricity, and the electrical power system further includes a rectifier configured to convert the alternating-current electricity to direct-current electricity and deliver the direct-current electricity to the pre-charging circuit.

Example 41

The electrical power system of any combination of examples 1-40, where the converter includes an inverter configured to receive direct-current electricity from the differential bus and convert the direct-current electricity to alternating-current electricity, and the electrical load includes a motor configured to drive a shaft based on the alternating-current electricity received from the inverter.

Example 42

A method for controlling a pre-charging circuit coupled between a power source and a differential bus, the method including activating and deactivating one or more switches of the pre-charging circuit to transfer energy power from the power source to a middle capacitor of the pre-charging circuit and isolate the middle capacitor from a bulk capacitor coupled between a high-side rail and a low-side rail of the differential bus. The method also includes activating and deactivating the one or more switches to transfer energy power from the middle capacitor to the bulk capacitor and isolate the middle capacitor from the power source.

Example 43

The method of example 42, further including deactivating a first switch, a second switch, a third switch, and a fourth switch of the pre-charging circuit, where transferring energy from the power source to the middle capacitor includes activating the first switch to charge a middle capacitor after deactivating the first switch, the second switch, the third switch, and the fourth switch. The method further includes deactivating the first switch after activating the first switch, where transferring energy from the middle capacitor to the bulk capacitor includes activating the fourth switch to pre-charge the bulk capacitor after deactivating the first switch. The method also includes deactivating the fourth switch after activating the fourth switch.

Example 44

The method of example 43, where the first switch is coupled to a first node of the power source, the second switch is coupled to a second node of the power source, the third switch is coupled to the high-side rail, and the fourth switch is coupled to the low-side rail.

Example 45

The method of any combination of examples 43-44, further including activating the first switch after deactivating the fourth switch.

Example 46

The method of any combination of examples 43-45, further including determining a short circuit condition in the first switch and suppressing operation in a forward charging mode in response to determining the short circuit condition in the first switch.

Example 47

The method of any combination of examples 43-46, further including determining a short circuit condition in the second switch and suppressing operation in a reverse charging mode in response to determining the short circuit condition in the second switch.

Example 48

The method of any combination of examples 43-47, further including determining a short circuit condition in the third switch and suppressing operation in a reverse charging mode in response to determining the short circuit condition in the third switch.

Example 49

The method of any combination of examples 43-48, further including determining a short circuit condition in the fourth switch and suppressing operation in a forward charging mode in response to determining the short circuit condition in the fourth switch.

Example 50

The method of any combination of examples 42-49, further including measuring a discharge time of the middle capacitor and determining an estimated capacitance of the bulk capacitor based on the discharge time of the middle capacitor.

Example 51

The method of any combination of examples 42-50, further including measuring a discharge time of the middle capacitor, determining whether the discharge time is less than a threshold level, and determining a short circuit condition in the bulk capacitor in response to determining that the discharge time is less than the threshold time duration.

Example 52

The method of any combination of examples 42-51, further including activating the one or more switches to connect the power source and the differential bus after a conclusion of a pre-charging process.

Example 53

The method of any combination of examples 42-51, further including determining whether a voltage across the middle capacitor has a reverse polarity after transferring energy power from the power source to the middle capacitor. The method also includes refraining from transferring energy power from the middle capacitor to the bulk capacitor in response to determining that the voltage across the middle capacitor has the reverse polarity.

Example 54

A device including a computer-readable medium having executable instructions stored thereon, configured to be executable by processing circuitry for causing the processing circuitry to activate and deactivate one or more switches of a pre-charging circuit to transfer energy power from a power source to a middle capacitor of the pre-charging circuit and isolate the middle capacitor from a bulk capacitor coupled between a high-side rail and a low-side rail of a differential bus, where the pre-charging circuit is coupled between the power source and differential bus. The instructions are further configured to cause the processing circuitry to activate and deactivate the one or more switches to transfer energy power from the middle capacitor to the bulk capacitor and isolate the middle capacitor from the power source.

Example 55

The device of example 54, where the instructions are configured to cause the processing circuitry to perform the method of examples 42-53 or any combination thereof.

Example 56

The electrical power system of any combination of examples 1-41, further including a controller configured to perform the method of examples 42-53 or any combination thereof.

Various examples have been described. Any combination of the described systems, operations, or functions is contemplated. These and other examples are within the scope of the following claims.

What is claimed is:

1. An electrical power converter comprising:
   a differential bus including a high-side rail and a low-side rail;
   a power source configured to generate power;
   a bulk capacitor coupled between the high-side rail and the low-side rail, the bulk capacitor configured to filter the power generated by the power source;
   a converter configured to convert the power filtered by the bulk capacitor; and
   a pre-charging circuit comprising one or more switches and a middle capacitor, the pre-charging circuit configured to pre-charge the bulk capacitor, wherein the one or more switches comprise:
      a first switch, wherein a drain terminal of the first switch is directly coupled to a first node of the power source;
      a second switch, wherein a drain terminal of the second switch is directly coupled to a second node of the power source;
      a third switch coupled to the high-side rail, wherein a source terminal of the first switch and a source terminal of the third switch are coupled to a first node of the middle capacitor, and wherein a drain terminal of the third switch is directly coupled to a first terminal of the bulk capacitor; and
      a fourth switch coupled to the low-side rail, wherein a source terminal of the second switch and a source terminal of the fourth switch are coupled to a second node of the middle capacitor, and wherein a drain terminal of the fourth switch is directly coupled to a second terminal of the bulk capacitor.

2. The electrical power system of claim 1,
   wherein the pre-charging circuit is configured to pre-charge the bulk capacitor prior to enabling conversion of the power by the converter, and
   wherein the pre-charging circuit is configured to connect and disconnect the high-side rail and the low-side rail while pre-charging the bulk capacitor.

3. The electrical power system of claim 1,
   wherein the first node of the middle capacitor is coupled between the first switch and the third switch, and
   wherein the second node of the middle capacitor is coupled between the second switch and the fourth switch.

4. The electrical power system of claim 1, further comprising a controller configured to:
   activate and deactivate the one or more switches to transfer energy from the power source to the middle capacitor and isolate the middle capacitor from the bulk capacitor; and
   activate and deactivate the one or more switches to transfer energy from the middle capacitor to the bulk capacitor and isolate the middle capacitor the power source.

5. The electrical power system of claim 1, further comprising a controller,
   wherein the one or more switches include a first switch coupled between the power source and the middle capacitor and a second switch coupled between the middle capacitor and the differential bus,
   wherein the controller is configured to transfer energy from the power source to the middle capacitor at least in part by activating the first switch and deactivating the second switch, and
   wherein the controller is configured to transfer energy from the power source to the middle capacitor at least in part by deactivating the first switch and activating the second switch.

6. The electrical power system of claim 1, further comprising a controller configured to:
   deactivate the first switch, the second switch, the third switch, and the fourth switch;
   activate the first switch after deactivating the first switch, the second switch, the third switch, and the fourth switch;
   deactivate the first switch after activating the first switch;
   activate the fourth switch after deactivating the first switch; and
   deactivate the fourth switch after activating the fourth switch.

7. The electrical power system of claim 1, further comprising a controller is configured to:
   determine a short circuit condition in the third switch; and
   suppress operation in a reverse charging mode in response to determining the short circuit condition in the third switch.

8. The electrical power system of claim 1, further comprising a controller is further configured to:
   measure a discharge time of the middle capacitor; and
   determine an estimated capacitance of the bulk capacitor based on the discharge time of the middle capacitor.

9. The electrical power system of claim 1, further comprising a controller is further configured to:
   measure a discharge time of the middle capacitor;
   determine whether the discharge time is less than a threshold level; and
   determine a short circuit condition in the bulk capacitor in response to determining that the discharge time is less than the threshold time duration.

10. The electrical power system of claim 1, further comprising a controller is further configured to:
    determine whether a voltage across the middle capacitor has a reverse polarity after transferring energy from the power source to the middle capacitor; and
    refrain from transferring energy from the middle capacitor to the bulk capacitor in response to determining that the voltage across the middle capacitor has the reverse polarity.

11. The electrical power system of claim 1, further including a controller is configured to:
    detect a ground fault at the high-side rail or at the low-side rail; and
    deactivate the first switch, the second switch, the third switch, and the fourth switch.

12. The electrical power system of claim 1, further comprising:

a first diode coupled in parallel with the first switch and configured to conduct electricity from the first node of the middle capacitor to the first node of the power source;

a second diode coupled in parallel with the second switch and configured to conduct electricity from the second node of the middle capacitor to the second node of the power source;

a third diode coupled in parallel with the third switch and configured to conduct electricity from the first node of the middle capacitor to the high-side rail; and a fourth diode coupled in parallel with the fourth switch and configured to conduct electricity from the second node of the middle capacitor to the low-side rail, wherein a drain terminal of the first switch is coupled to the first node of the power source, wherein a drain terminal of the second switch is coupled to the second node of the power source, wherein a drain terminal of the third switch is coupled to the high-side rail and the bulk capacitor, wherein a drain terminal of the fourth switch is coupled to the low-side rail and the bulk capacitor, wherein the first switch comprises a first n-channel metal-oxide-semiconductor field-effect transistor and a first antiparallel diode, and wherein the second switch comprises a second n-channel metal-oxide-semiconductor field-effect transistor and a second antiparallel diode.

13. The electrical power system of claim 1, wherein the middle capacitor comprises a self-healing, non-polarized capacitor.

14. A method for controlling a pre-charging circuit coupled between a power source and a differential bus, the method comprising:

activating and deactivating one or more switches of the pre-charging circuit to transfer energy from the power source to a middle capacitor of the pre-charging circuit and isolate the middle capacitor from a bulk capacitor coupled between a high-side rail and a low-side rail of the differential bus;

activating and deactivating the one or more switches to transfer energy from the middle capacitor to the bulk capacitor and isolate the middle capacitor from the power source;

measuring a discharge time of the middle capacitor; and determining an estimated capacitance of the bulk capacitor based on the discharge time of the middle capacitor.

15. The method for controlling the pre-charging circuit of claim 14, the method further comprising:

determining whether a voltage across the middle capacitor has a reverse polarity after transferring energy from the power source to the middle capacitor; and refraining from transferring energy from the middle capacitor to the bulk capacitor in response to determining that the voltage across the middle capacitor has the reverse polarity.

16. The method for controlling the pre-charging circuit of claim 14, the method further comprising:

measuring a discharge time of the middle capacitor;

determining whether the discharge time is less than a threshold level; and determining a short circuit condition in the bulk capacitor in response to determining that the discharge time is less than the threshold time duration.

17. The method for controlling the pre-charging circuit of claim 14, the method further comprising:

pre-charging the bulk capacitor prior to enabling conversion of the power by the converter; and connecting and disconnecting the high-side rail and the low-side rail while pre-charging the bulk capacitor.

18. A device comprising a non-transitory computer-readable medium having executable instructions stored thereon, configured to be executable by processing circuitry for causing the processing circuitry to:

activate and deactivate one or more switches of a pre-charging circuit to transfer energy from a power source to a middle capacitor of the pre-charging circuit and isolate the middle capacitor from a bulk capacitor coupled between a high-side rail and a low-side rail of a differential bus, wherein the pre-charging circuit is coupled between the power source and differential bus;

activate and deactivate the one or more switches to transfer energy from the middle capacitor to the bulk capacitor and isolate the middle capacitor from the power source;

determine whether a voltage across the middle capacitor has a reverse polarity after transferring energy from the power source to the middle capacitor; and refrain from transferring energy from the middle capacitor to the bulk capacitor in response to determining that the voltage across the middle capacitor has the reverse polarity.

19. The device of claim 18, wherein the instructions are configured to cause the processing circuitry to:

measure a discharge time of the middle capacitor; and determine an estimated capacitance of the bulk capacitor based on the discharge time of the middle capacitor.

20. The device of claim 18, wherein the instructions are configured to cause the processing circuitry to:

measure a discharge time of the middle capacitor;

determine whether the discharge time is less than a threshold level; and determine a short circuit condition in the bulk capacitor in response to determining that the discharge time is less than the threshold time duration.

* * * * *